United States Patent
Kuroda et al.

(10) Patent No.: US 7,286,300 B2
(45) Date of Patent: Oct. 23, 2007

(54) ZOOM LENS AND IMAGE PICKUP APPARATUS

(75) Inventors: Daisuke Kuroda, Kanagawa (JP); Masafumi Sueyoshi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/402,861

(22) Filed: Apr. 13, 2006

(65) Prior Publication Data

US 2006/0268428 A1 Nov. 30, 2006

(30) Foreign Application Priority Data

Apr. 25, 2005 (JP) ............. P 2005-125957

(51) Int. Cl.
*G02B 15/22* (2006.01)
*G02B 15/14* (2006.01)

(52) U.S. Cl. .................. 359/693; 359/676
(58) Field of Classification Search ................ 359/693
See application file for complete search history.

(56) References Cited

U.S. PATENT DOCUMENTS

| | | | |
|---|---|---|---|
| 3,817,600 A * | 6/1974 | Watanabe et al. ........... | 359/693 |
| 3,912,376 A * | 10/1975 | Ogura et al. ............... | 359/693 |
| 4,078,857 A | 3/1978 | Kantner et al. | |
| 4,770,511 A * | 9/1988 | Yonezawa et al. .......... | 359/693 |
| 4,787,719 A * | 11/1988 | Imai ........................... | 359/684 |
| 4,917,482 A | 4/1990 | Ito | |
| 5,191,475 A * | 3/1993 | Terasawa et al. ........... | 359/684 |
| 5,691,851 A * | 11/1997 | Nishio et al. ............... | 359/683 |
| 6,353,506 B1* | 3/2002 | Ohashi ........................ | 359/687 |
| 2005/0036212 A1* | 2/2005 | Saito ........................... | 359/708 |

FOREIGN PATENT DOCUMENTS

| | | |
|---|---|---|
| JP | 01-298307 | 12/1989 |
| JP | 11-235232 | 8/1999 |
| JP | 2001-059938 A | 3/2001 |
| JP | 2002-244039 A | 8/2002 |

OTHER PUBLICATIONS

EPO Search Report mailed on Aug. 22, 2006.

* cited by examiner

*Primary Examiner*—Jordan M. Schwartz
(74) *Attorney, Agent, or Firm*—Rader Fishman & Grauer PLLC; Ronald P. Kananen

(57) ABSTRACT

A zoom lens is disclosed which has a macro mode wherein the magnifying power is higher than 0.5. The zoom lens includes a first positive lens group, a second negative lens group movable upon power variation, and a plurality of movable lens groups cooperable with the second group to form a macro lens group, disposed in order from an object side. The movable lens groups include a single focusing group, and an additional negative lens group disposed further on the image side. The zoom lens has a macro mode in which it can be focused at a shorter distance than an ordinary region by moving the macro lens group integrally from a telephoto end position toward the object side while the first lens group is fixed at the telephotograph end.

7 Claims, 16 Drawing Sheets

ZOOM LENS AND IMAGE PICKUP APPARATUS

CROSS REFERENCES TO RELATED APPLICATIONS

The present invention contains subject matter related to Japanese Patent Application JP 2005-125957, filed in the Japanese Patent Office on Apr. 25, 2005, the entire contents of which being incorporated herein by reference.

BACKGROUND OF THE INVENTION

This invention relates to a novel zoom lens and image pickup apparatus, and more particularly to a zoom lens which has a macro mode and an image pickup apparatus in which the zoom lens is used.

In recent years, image pickup apparatus which use a solid-state image pickup device such as digital still cameras have been and are being popularized. Above all, together with the popularization of digital still cameras, a zoom lens is demanded which is superior in compactness and has a macro mode which can implement a high image pickup magnifying power while it covers a wide range from the very wide angle side to the telephoto side by means of the single lens.

Conventionally, various types of zoom lenses which have a macro mode have been proposed. For example, Japanese Patent Laid-open No. Hei 1-298307 (hereinafter referred to as Patent Document 1) discloses a zoom lens wherein a first lens group is used for focusing in an ordinary region and a plurality of lens groups different from the first lens group are moved independently of each other in the direction of an optical axis to perform focusing in a macro region thereby to achieve a high magnifying power. However, to an image pickup apparatus of the lens-integration type having an automatic focusing function which has a great angle of field and uses a contrast detection system, it is not preferable to perform focusing in an ordinary region using the first lens group. Further, it is not preferable to use different lens groups to perform focusing in an ordinary region and focusing in a macro region because this complicates the mechanism.

Japanese Patent Laid-open No. Hei 11-235232 (hereinafter referred to as Patent Document 2) discloses a zoom lens which solves of the problems of the zoom lens of Patent Document 1 described above and is used optimally with an image pickup apparatus which uses a contrast detection system. According to the zoom lens of Patent Document 2, the second and third groups of a four-group zoom lens having positive, negative, positive and positive refracting powers are moved to obtain a macro region. Further, not only in the ordinary region but also in the macro region, the fourth lens group is used for focusing.

SUMMARY OF THE INVENTION

However, since the zoom lens disclosed in Patent Document 2 is a four-group zoom lens-having positive, negative, positive and positive refracting powers, it has problems that it is difficult to simultaneously achieve further increase in angle and magnification and that the magnifying power is low.

It is desirable for the present invention to provide a zoom lens and an image pickup apparatus which are suitable for use with a video camera and a still camera and are superior in compactness with a small front lens diameter while an increased angle of view and increased power variation are achieved and besides have a macro mode wherein the magnifying power is higher than 0.5.

In order to attain the desire described above, according to an embodiment of the present invention, there is provided a zoom lens including a first lens group having a positive refracting power, a second lens group having a negative refracting power and serving as a movable group upon power variation of the zoom lens, and a plurality of movable lens groups cooperable with the second group to form a macro lens group, the first lens group, second lens group and movable lens groups being disposed in order from an object side, the movable lens groups including a single focusing group and an additional lens group disposed on the image side with respect to the single focusing group and having a negative refracting power, the zoom lens having a macro mode in which the zoom lens can be focused at a shorter distance than an ordinary region by moving the macro lens group integrally from a position at a telephoto end toward the object side while the first lens group is fixed at the telephotograph end.

According to another embodiment of the present invention, there is provided an image pickup apparatus including a zoom lens, and an image pickup element for converting an optical image formed by the zoom lens into an electric signal, the zoom lens including a first lens group having a positive refracting power, a second lens group having a negative refracting power and serving as a movable group upon power variation of the zoom lens, and a plurality of movable lens groups cooperable with the second group to form a macro lens group, the first lens group, second lens group and movable lens groups being disposed in order from an object side, the movable lens groups including a single focusing group and an additional lens group disposed on the image side with respect to the focusing group and having a negative refracting power, the zoom lens having a macro mode in which the zoom lens can be focused at a shorter distance than an ordinary region by moving the macro lens group integrally from a position at a telephoto end toward the object side while the first lens group is fixed at the telephotograph end.

Each of the zoom lens and the zoom lens of the image pickup is superior in compactness with a small front lens diameter while an increased angle of view and increased power variation are achieved because it includes a first lens group having a positive refracting power, a second lens group having a negative refracting power and serving as a movable group upon power variation of the zoom lens, and a plurality of movable lens groups cooperable with the second group to form a macro lens group, disposed in order from an object side, and the movable lens groups includes a single focusing group, and an additional lens group disposed on the image side with respect to the single focusing group and having a negative refracting power. Particularly, since the lens group having a negative refracting power is disposed on the image side of the focusing group, it provides an action of expanding the image, and consequently, not only miniaturization and increase in angle of the zoom lens can be achieved but also the close image pickup distance can be reduced.

Further, the zoom lens has a macro mode in which the zoom lens can be focused at a shorter distance than the ordinary region by moving the macro lens group integrally from a position at a telephoto end toward the object side while the first lens group is fixed at the telephotograph end. Therefore, the zoom lens can have a macro mode in which the expansion scale factor is higher than 0.5. Besides, since the same lens group is used for focusing both upon ordinary image pickup and upon macro image pickup, the zoom lens can be applied suitably to an image pickup apparatus of the lens-integration type which uses a contrast detection system with a small variation of the angle of field and has an AF function.

Preferably, the zoom lens and the image pickup apparatus are configured such that the plurality of movable lens groups include a third lens group having a positive refracting power, a fourth lens group having a positive refracting power and performing focusing when moved in a direction of an optical axis, a fifth lens group having a low refracting power, and a sixth lens group having a negative refracting power, the second to sixth lens groups forming the macro lens group. In the zoom lens and the image pickup apparatus, since the sixth lens group has a negative refracting power and can expand the image at a stroke, the entire lens system can be further miniaturized.

Preferably, the zoom lens is configured such that, where the focal length of the entire lens system at the wide angle end is represented by fw, the focal length of the entire lens system at the telephoto end by fT, the focal length of the first lens group by f1, the focal length of the macro lens group at the telephoto end by fmgT and the back focus length at the wide angle end by Twbf, the following expressions (1) 0.6<f1/fT<2.0, (2) 0.1<fmgT/fT<0.4 and (3) 0.2<|Twbf/fw|<1.2 are satisfied. With the zoom lens, further miniaturization and further enhancement in picture quality can be achieved.

Preferably, the zoom lens is configured such that, where the lateral magnification of the negative lenses included in the macro lens group at a macro position at which the magnifying power is highest is represented by βmgT, the following expression (4) 1.1<βmgT<2.0 is satisfied. With the zoom lens, further miniaturization of the entire lens system can be anticipated, and also where a large size image pickup element is used, image pickup to a nearer location can be anticipated and a higher image pickup magnification can be achieved.

Preferably, the zoom lens is configured such that, where the focal length of the focusing group is represented by ff and the focal length of the macro lens group at the telephoto end by fmgT, the following expression (5) 1.0<ff/fmgT<5.0 is satisfied. With the zoom lens, the spherical aberration can be corrected better and further miniaturization can be anticipated.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
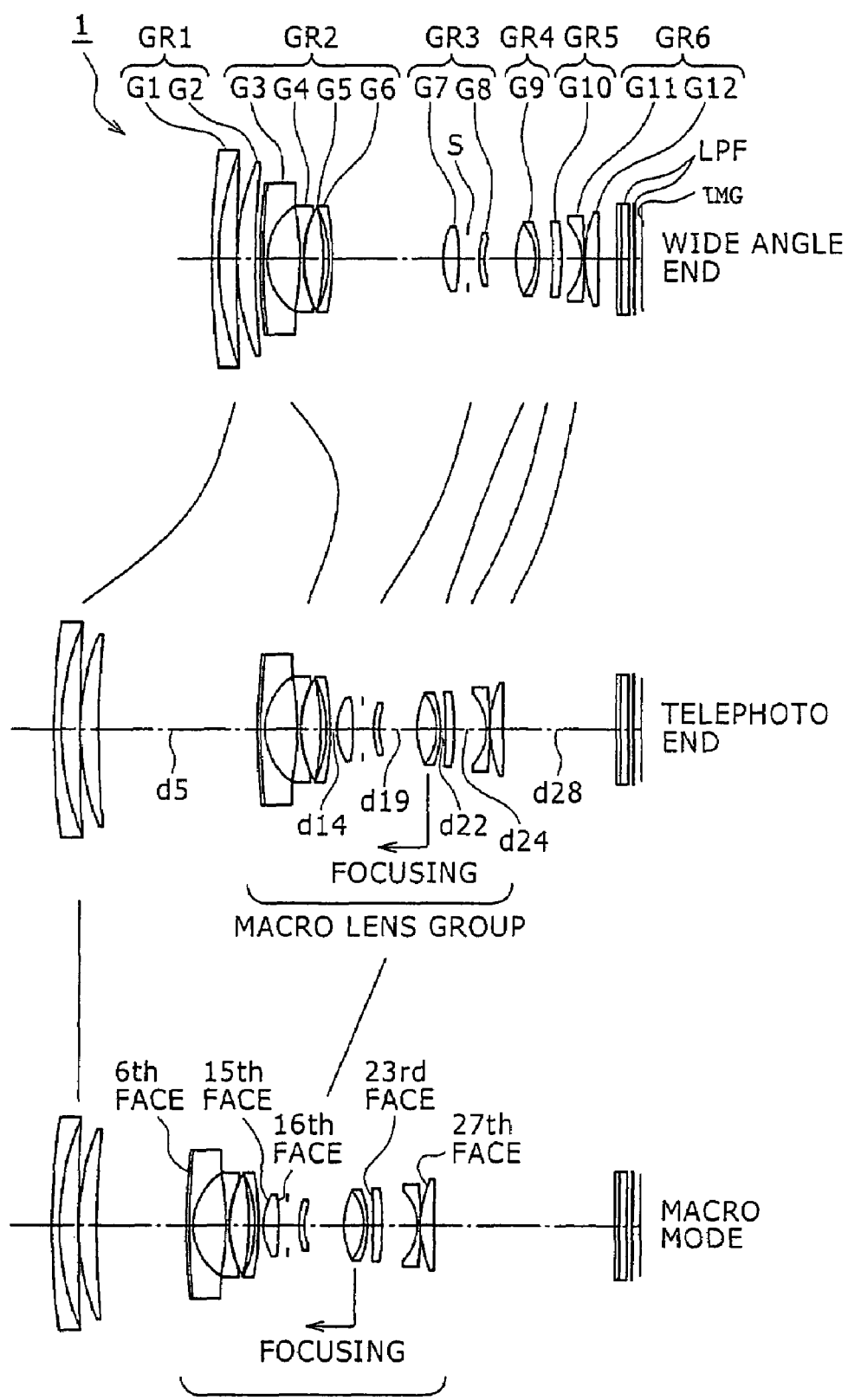
FIG. 1 is a schematic view showing a lens configuration of a zoom lens to which the present invention is applied.

In the following, preferred embodiments of the present invention wherein the present invention is applied to a zoom lens and an image pickup apparatus are described.

The zoom lens of the present invention includes a first lens group having a positive refracting power, a second lens group having a negative refracting power and serving as a movable group upon power variation of the zoom lens, and a plurality of movable lens groups cooperable with the second group to form a macro lens group. The first lens group, second lens group and movable lens groups are disposed in order from an object side. The movable lens groups include a third lens group, a single focusing group disposed on an image side with respect to the third lens group, and an additional lens group disposed on the image side with respect to the focusing group and having a negative refracting power. The zoom lens can achieve a macro mode in which the magnifying power is higher than 0.5 by moving the macro lens group integrally from a position at the telephoto end toward the object side while the first lens group is fixed at the telephotograph end.

Consequently, the zoom lens has an image pickup angle of view as wide as 60 to 100 degrees at the wide angle end and has a magnifying power of approximately 3 to 7 times. Further, the zoom lens is superior in compactness with a small front lens diameter and has a macro mode in which the magnifying power is higher than 0.5. Besides, the zoom lens can easily perform a focusing operation in the macro mode. Therefore, the zoom lens is suitably used with an image pickup apparatus which uses a contrast detection system and has an AF function.

Particularly in the macro mode, by moving the macro lens group integrally to the object side while only the first lens group having a positive refracting power is fixed at the position of the telephoto end, the zoom lens can achieve a high image forming performance similar to that of a zoom lens of the entirely feeding type without changing the total length of the lens.

Further, since the lens group positioned rearwardly of the focusing group, that is, positioned on the image side in the macro lens group has a negative refracting power and has a high magnifying power, the image can be expanded at a stroke. Therefore, the entire lens system can be miniaturized. In addition, also where a large size image pickup element is used, image pickup even at a nearer location can be anticipated and a higher image pickup magnification can be anticipated.

Particularly, the zoom lens is configured such that the third lens group has a positive refracting power and the focusing group is formed as a fourth lens group which has a positive refracting power and performs focusing when moved in a direction of an optical axis, and the additional lens group includes a fifth lens group having a low refracting power and a sixth lens group having a negative refracting power, and besides the second to sixth lens groups form the macro lens group. Consequently, the zoom lens has an image pickup angle of view as wide as 60 to 100 degrees at the wide angle end and besides has a magnifying power of approximately 3 to 7 times. Further, the zoom lens is superior in compactness with a small front lens diameter and has a macro mode in which the magnifying power is higher than 0.5. Furthermore, the zoom lens can easily perform a focusing operation in the macro mode. Therefore, the zoom lens is suitably used with an image pickup apparatus which uses a contrast detection system and has an AF function.

Particularly in the macro region, by moving the second to sixth lens groups integrally with each other to the object side while only the first lens group having a positive refracting power which is not very high is fixed at the position of the telephoto end, the zoom lens can achieve a high image forming performance similar to that of a zoom lens of the entirely feeding type without changing the total length of the lens.

Further, since the sixth lens group has a negative refracting power and has a high magnifying power, the image can be expanded at a stroke. Therefore, the entire lens system can be miniaturized. In addition, also where a large size image pickup element is used, image pickup even at a nearer location can be anticipated and a higher image pickup magnification can be anticipated.

Preferably, the zoom lens is configured such that, where the focal length of the entire lens system at the wide angle end is represented by fw, the focal length of the entire lens system at the telephoto end by fT, the focal length of the first lens group by f1, the focal length of the macro lens group at the telephoto end by fmgT and the back focus length at the wide angle end by Twbf, the following expressions (1) to (3) are satisfied:

$$0.6 < f1/fT < 2.0 \qquad (1).$$

$$0.1 < fmgT/fT < 0.4 \qquad (2).$$

$$0.2 < "Twbf/fw" < 1.2 \qquad (3).$$

The conditional expression (1) above defines the ratio between the focal length of the first lens group having a positive refracting power and the focal length of the entire lens system at the telephoto end. If the ratio f1/fT become equal to or lower than 0.6, then the refracting power of the first lens group becomes excessively high and the influence of various aberrations beginning with the spherical aberration becomes significant. Therefore, even with the entire lens system, it becomes difficult to correct the aberrations over the entire macro region from the wide angle and to the telephoto end. On the other hand, if the ratio f1/fT becomes higher than 2.0, then the refracting power of the first lens group becomes so low that it is difficult to achieve a high magnifying power and also it is difficult to achieve reduction in size and weight.

The conditional expression (2) above defines the ratio between the focal length in the telephoto region of the macro lens group including the second lens group having a positive refracting power and the focusing group as well as the additional lens group disposed rearwardly of the focusing group and having a negative refracting power and the focal length at the telephoto end of the entire lens system. If the ratio fmgT/fT become equal to or lower than 0.1, then the refracting power of the macro lens group becomes excessively high and the influence of various aberrations beginning with the spherical aberration becomes significant. Therefore, even with the entire lens system, it becomes difficult to correct the aberrations over the entire macro region from the wide angle and to the telephoto end. On the other hand, if the ratio fmgT/fT becomes higher than 0.4, then the refracting power of the macro lens group becomes so low that it is difficult to achieve a high magnifying power and also it is difficult to achieve reduction in size and weight. Besides, in order to achieve a desired magnifying power, the movable region of the macro lens group must be increased, which is not preferable in size and also in structure.

The conditional expression (3) above defines the ratio between the back focus length (BF length) at the wide angle end and the focal length of the entire lens system at the wide angle end. In particular, if the value of the ratio |Twbf/fw| becomes equal to or lower than 0.2, then a low-pass filter or an IR (infrared cutting) glass plate, which are usually interposed between the final lens face of the lens system and the image pickup plane, is located very near to the surface of the image pickup element, and in a minimum iris state, a defect of or a foreign matter sticking to the low-pass filter or the IR glass plate is likely to be conspicuous. On the other hand, if the value of the ratio |Twbf/fw| becomes higher than 1.2, then the front lens diameter becomes so great that miniaturization becomes difficult and besides increase in angle becomes difficult. Further preferably, the value of the ratio |Twbf/fw| is within a range from 0.3 to 0.8.

Preferably, the zoom lens is configured such that, where the lateral magnification of the negative lenses included in the macro lens group at a macro position at which the magnifying power is highest is represented by βmgT, the following expression (4) is satisfied:

$$1.1 < \beta mgT < 2.0 \qquad (4)$$

Since the additional lens group included in the macro lens group has a negative refracting power and has a high magnifying power, the image can be expanded at a stroke. Therefore, the entire lens system can be miniaturized. In addition, also where a large size image pickup element is used, image pickup even at a nearer location can be anticipated and a higher image pickup magnification can be anticipated as described above. However, if the value of βmgT becomes equal to or lower than 1.1, then the magnifying power by the additional lens group having a negative refracting power and included in the macro lens group becomes low. Consequently, miniaturization of the entire lens system becomes difficult and also the closest distance becomes long. On the other hand, if the value of βmgT becomes higher than 2.0, then also the residual aberrations of the lens groups positioned on the object side with respect to the additional lens group having a negative refracting power increase, resulting in increase of the deterioration of the image forming performance. Also the eccentricity sensitivity of the lens increases and also the accuracy in assembly of the lens becomes very severe, which are not preferable to fabrication of the zoom lens.

Preferably, the zoom lens is configured such that, where the focal length of the focusing group is represented by ff and the focal length of the macro lens group at the telephoto end by fmgT, the following expression (5) is satisfied:

$$1.0 < ff/fmgT < 5.0 \qquad (5)$$

The conditional expression (5) defines the ratio between the focal length of the focusing group and the focal length at the telephoto end of the macro lens group. In particular, if the value of the ratio ff/fmg becomes equal to or lower than 1.0, then the power of the focusing group becomes so high that the aberration fluctuation by variation of the object distance becomes great and particularly the variation of the spherical aberration at an intermediate focal length becomes great. On the other hand, if the value of the ratio ff/fmg becomes equal to or higher than 5.0, then the power of the focusing group becomes so low that the movable range of the focusing group become great, resulting in difficulty in miniaturization.

In the zoom lens of the present invention, preferably the iris is disposed in the macro lens group or in the proximity of the macro lens group and integrally moves, in the macro mode, together with the macro lens group.

In the zoom lens of the present invention, preferably the movable lens of the focusing group in the macro mode is substantially same as the movable range at the telephoto end of the ordinary image pickup region. This is because, since the macro mode can be added without varying the movable range of the focusing group, there is no necessity to provide additional spaces forwardly and backwardly of the focusing group in the ordinary image pickup region, which is optimum for miniaturization.

It is to be noted that any of the lens groups of the zoom lens of the present invention need not necessarily be composed of dioptric lenses which refract an incident ray of light (that is, lenses of the type wherein deflection of light occurs with an interface between different media having different refractive indices from each other). For example, any of the lens groups may be composed of diffraction type lenses which deflect an incident ray of light by diffraction, hybrid type lenses of refraction and diffraction which deflect an incident ray of light by a combination of a diffraction action and a refraction action, refractive index distribution type lenses which deflect an incident ray of light by a refractive index distribution in a medium, and the like lenses.

Further, a face which does not have any optical power (for example, a reflecting face, a refracting face or a diffracting face) may be interposed in the optical path to bend the optical path forwardly, rearwardly or halfway of the zoom lens. The deflection position may be set as occasion demands, and apparent reduction in thickness of an image pickup apparatus (for example, a camera) can be achieved by appropriate deflection of a light path.

Also it is possible to shift an image by shifting one or a plurality of lens groups from among the lens groups which compose the zoom lens of the present invention or by shifting one or some of lenses of one of the lens groups in a direction substantially perpendicular to the optical axis. If a detection system for detecting a blur of a camera, a driving system for shifting a lens group and a control system for providing a shift amount to the driving system in response to an output of the detection system are combined, then they can function as a vibration preventing optical system.

Particularly in the zoom lens of the present invention, the image can be shifted with little aberration variation by shifting some or all of the third, fourth and fifth lens groups which are part of the macro lens group in a direction substantially perpendicular to the optical axis. Since the third lens group is disposed in the proximity of the aperture stop, an off-axis light flux passes in the proximity of the optical axis, and therefore, the fluctuation of the comatic aberration appearing when the image is shifted is small.

In the following, three zoom lenses according to different embodiments of the present invention and numerical value examples wherein specific numerical values are applied in the embodiments are described with reference to FIGS. 1 to 15 and Tables 1 to 13.

It is to be noted that an aspheric face is used in the embodiments and the shape of the aspheric face is defined by the following expression (1):

$$x = \frac{y^2 \cdot c^2}{1 + \sqrt{1 - (1+K) \cdot y^2 \cdot c^2}} + \sum A^i \cdot y^i \qquad (1)$$

where x is the distance from the lens plane vertex in the direction of the optical axis, y the height in a direction perpendicular to the optical axis, c the paraxial radius of curvature at the lens vertex, K a conic constant, and $A^i$ the ith order aspheric constant.

FIG. 1 shows a configuration of a zoom lens according to a first embodiment of the present invention. Referring to FIG. 1, the zoom lens 1 shown includes a first lens group GR1 having a positive refracting power, a second lens group GR2 having a negative refracting power, a third lens group GR3 having a positive refracting power, a fourth lens group GR4 having a positive refracting power, a fifth lens group GR5 having a low refracting power, and a sixth lens group GR6 having a negative refracting power, disposed in order from the object side. Upon power variation, the lens groups move on the optical axis as indicated by a solid line arrow mark in FIG. 1.

The first lens group GR1 includes a cemented lens G1 composed of a negative lens and a positive lens, and a positive lens G2. The second lens group GR2 includes a negative lens G3 having a composite aspheric face on the object side, a negative lens G4, a positive lens G5 and another negative lens G6. The third lens group GR3 includes a positive lens G7 having an aspheric face on the opposite sides thereof, an iris S and a negative lens G8. The fourth lens group GR4 forms a focusing group and includes a cemented lens G9 of a positive lens and a negative lens. The fifth lens group GR5 includes a lens G10 having a low refracting power and having an aspheric face on the object side. The sixth lens group GR6 includes a negative lens G11, and a positive lens G12 having an aspheric face on the object side.

The zoom lens 1 can be placed into a macro mode in which an higher magnifying power than in an ordinary image pickup region can be achieved by moving the lens groups from the second lens group GR2 to the sixth lens group GR6 (macro lens group) integrally with each other toward the object side from the positions of them in a telephoto end state of the zoom lens 1 shown at an intermediate stage in FIG. 1 to a state shown at a lower stage in FIG. 1.

Further, in the zoom lens 1 according to the first embodiment and also in the zoom lenses according to the second and third embodiments hereinafter described, a low-pass filter LPF in the form of a parallel flat plate is interposed between the final lens face and an image pickup plane IMG. It is to be noted that the low-pass filter LPF may be formed from a double refraction type low-pass filter made of quartz or the like whose crystal orientation is adjusted, a phase type low-pass filter by which a required characteristic for an optical cutoff frequency is achieved by a diffraction effect or some other suitable low-pass filter.

Table 1 indicates values of several dimensions of the numerical value example 1 where particular numerical values are applied to the zoom lens 1 of the first embodiment described above. The term "face No." in the dimension tables of the numerical value example 1 and numerical value examples hereinafter described indicates the ith face from the object side, "R" the radius of curvature of the ith face, "D" the on-axis face distance between the ith face and the i+1th face, "Nd" the refractive index of the glass material having the ith face on the object side with regard to the d-line ($\lambda$=587.6 nm), and Vd the Abbe number of the glass material having the ith face on the object side with regard to the d-line. Further, a face indicated by "ASP" is an aspheric face. The radius of curvature "INFINITY" represents that the face is a flat face.

TABLE 1

| Face No. | R | | D | Nd | Vd |
|---|---|---|---|---|---|
| 1 | 236.679 | | 1.800 | 1.8467 | 23.7848 |
| 2 | 74.730 | | 4.800 | 1.7725 | 49.6243 |
| 3 | 404.369 | | 0.200 | | |
| 4 | 63.998 | | 4.387 | 1.8350 | 42.9842 |
| 5 | 200.000 | | Variable | | |
| 6 | −14234.997 | ASP | 0.200 | 1.5361 | 41.2000 |
| 7 | 139.743 | | 1.600 | 1.8350 | 42.9842 |
| 8 | 15.504 | | 8.212 | | |
| 9 | −76.456 | | 1.100 | 1.8350 | 42.9842 |

TABLE 1-continued

| Face No. | R | | D | Nd | Vd |
|---|---|---|---|---|---|
| 10 | 31.572 | | 0.347 | | |
| 11 | 30.386 | | 5.020 | 1.8467 | 23.7848 |
| 12 | −59.027 | | 1.164 | | |
| 13 | −38.000 | | 1.100 | 1.8350 | 42.9842 |
| 14 | −71.863 | | Variable | | |
| 15 | 17.169 | ASP | 4.053 | 1.5831 | 59.4596 |
| 16 | −39.298 | ASP | 2.500 | | |
| Iris | INFINITY | | 3.000 | | |
| 18 | 32.633 | | 1.200 | 1.9229 | 20.8835 |
| 19 | 15.818 | | Variable | | |
| 20 | 25.189 | | 5.001 | 1.4970 | 81.6084 |
| 21 | −15.000 | | 0.900 | 1.8340 | 37.3451 |
| 22 | −23.528 | | Variable | | |
| 23 | −74.636 | ASP | 2.000 | 1.8061 | 40.7344 |
| 24 | −116.955 | | Variable | | |
| 25 | −14.063 | | 1.000 | 1.8340 | 37.3451 |
| 26 | −102.927 | | 0.200 | | |
| 27 | 24.380 | ASP | 3.091 | 1.8467 | 23.7848 |
| 28 | −1000.000 | | Variable | | |
| 29 | INFINITY | | 1.200 | 1.5168 | 64.1983 |
| 30 | INFINITY | | 1.620 | 1.5523 | 63.4241 |
| 31 | INFINITY | | 1.000 | 1.0000 | |
| 32 | INFINITY | | 0.500 | 1.5567 | 58.6492 |
| 33 | INFINITY | | 1.000 | 1.0000 | |
| IMG | INFINITY | | | | |

The focal length f, F number Fno and half angle of view $\omega$ at the wide angle end, at an intermediate focal length between the wide angle end and the telephoto end and at the telephoto end in the numerical value example 1 are indicated in Table 2.

TABLE 2

| F | 14.726 | 33.938 | 78.218 |
|---|---|---|---|
| Fno. | 2.866 | 3.951 | 4.967 |
| $\omega$ | 42.228 | 20.580 | 9.230 |

In the zoom lens 1, upon power variation, the lens group distances d5, d14, d19, d22, d24 and d28 vary. On the other hand, upon focusing, the distance d19 between the third lens group GR3 and the fourth lens group GR4 and the distance d22 between the fourth lens group GR4 and the fifth lens group GR5 vary. Thus, values of the variable distances given above upon focusing at the wide angle end (f=14.726), intermediate focal distance (f=33.938) and telephoto end (f=78.218) upon focusing on infinity and upon focusing at the wide angle end, intermediate focal distance and telephoto end upon focusing at a short distance (distance to the object 0.34 m) in the ordinary image pickup region and upon focusing on the greatest distance (0.58 m) and on the smallest distance (0.24 m) in the macro region in the numerical value example 1 are indicated in Table 3 together with the magnifying power.

TABLE 3

|  | Ordinary image pickup region | | | | | | Macro region | |
| --- | --- | --- | --- | --- | --- | --- | --- | --- |
| f | 14.726 | 33.938 | 78.218 | | | | | |
| Object distance | Infinite | Infinite | Infinite | 0.34 m | 0.34 m | 0.34 m | 0.58 m | 0.24 m |
| Magnifying power | 0.000 | 0.000 | 0.000 | 0.058 | 0.131 | 0.297 | 0.150 | 0.600 |
| d5 | 1.000 | 15.354 | 41.184 | 1.000 | 15.354 | 41.184 | 23.059 | 23.059 |
| d14 | 28.734 | 8.866 | 1.000 | 28.734 | 8.866 | 1.000 | 1.000 | 1.000 |
| D19 | 8.228 | 7.546 | 10.207 | 7.659 | 5.589 | 2.386 | 10.206 | 2.398 |
| d22 | 3.478 | 4.159 | 1.499 | 4.047 | 6.117 | 9.319 | 1.499 | 9.308 |
| d24 | 5.366 | 7.173 | 8.883 | 5.366 | 7.173 | 8.883 | 8.883 | 8.883 |
| d28 | 5.000 | 15.943 | 29.385 | 5.000 | 15.943 | 29.385 | 47.510 | 47.510 |

In the zoom lens 1, each of the 6th, 15th, 16th, 23rd and 27th faces is formed from an aspheric face. Therefore, the aspheric surface coefficient of each of the faces in the numerical value example 1 is indicated in Table 4 together with the conic constant. It is to be noted that, in Table 4 and succeeding tables in which an aspheric constant is indicated, "E-i" is an exponential expression wherein the base is 10, that is, "10$^{-i}$", and for example, "0.12345E-05" represents "0.12345×10$^{-5}$".

TABLE 4

| Face No. | K | A$^4$ | A$^6$ | A$^8$ | A$^{10}$ |
| --- | --- | --- | --- | --- | --- |
| 6 | 0.000E+00 | 1.745E-05 | -3.647E-08 | 5.90E-11 | -5.19E-14 |
| 15 | 0.000E+00 | -3.017E-05 | -6.668E-08 | 4.48E-10 | -3.90E-13 |
| 16 | 0.000E+00 | 1.724E-05 | -4.398E-08 | 4.88E-10 | 0.00E+00 |
| 23 | 0.000E+00 | 4.904E-05 | -1.037E-07 | 3.21E-10 | 2.90E-12 |
| 27 | 0.000E+00 | -7.598E-05 | 3.521E-07 | -1.64E-09 | 3.9E-12 |

Figure 2:
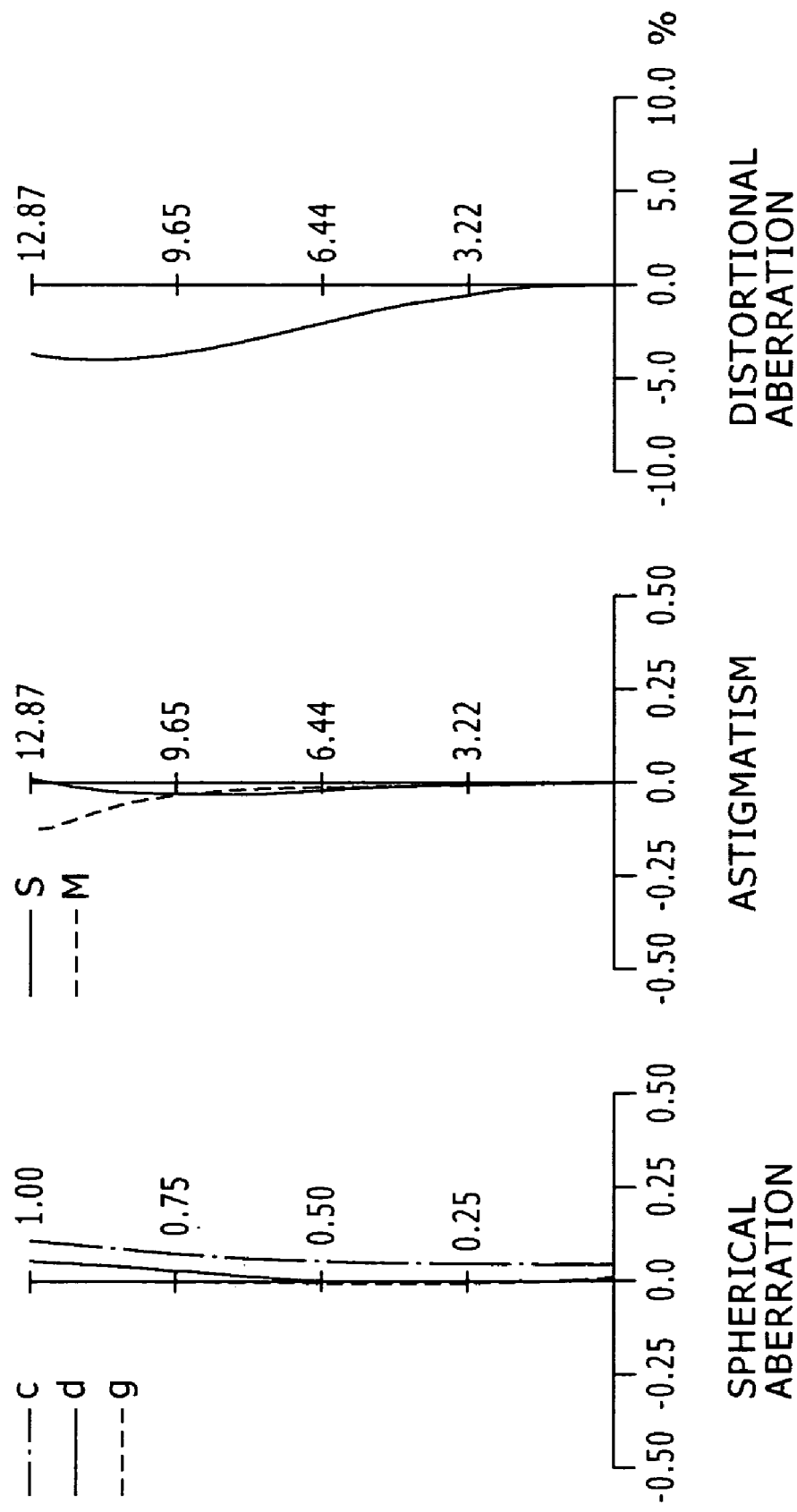
FIG. 2 is a diagrammatic view illustrating a spherical aberration, an astigmatism and a distortional aberration at the wide angle end of the zoom lens in an infinitely focused state according to a numerical example 1 wherein particular numerical values are applied to the zoom lens of FIG. 1.
Figure 3:
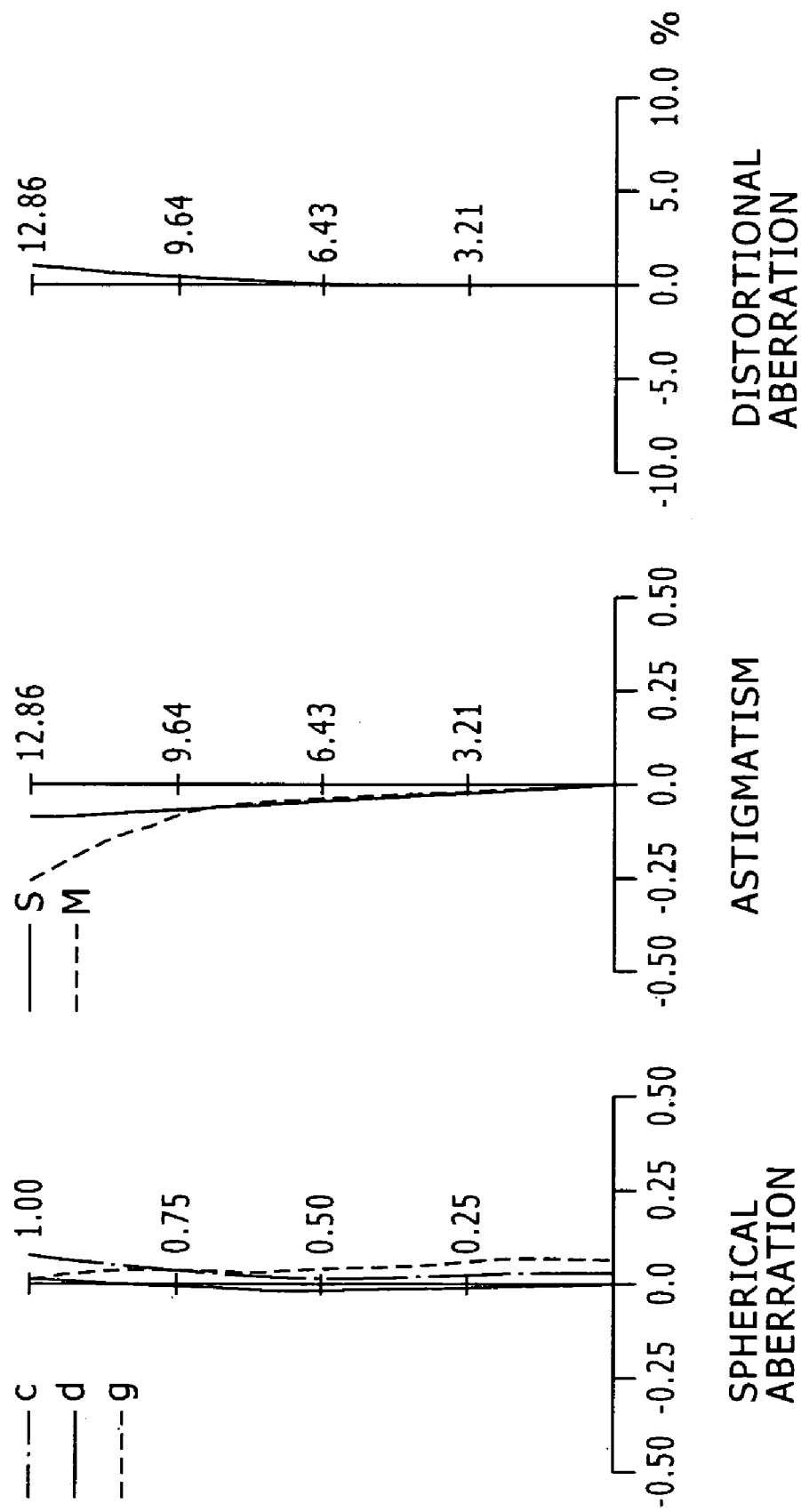
FIG. 3 is a similar view but illustrating a spherical aberration, an astigmatism and a distortional aberration at an intermediate focal length according to the numerical example 1.
Figure 4:
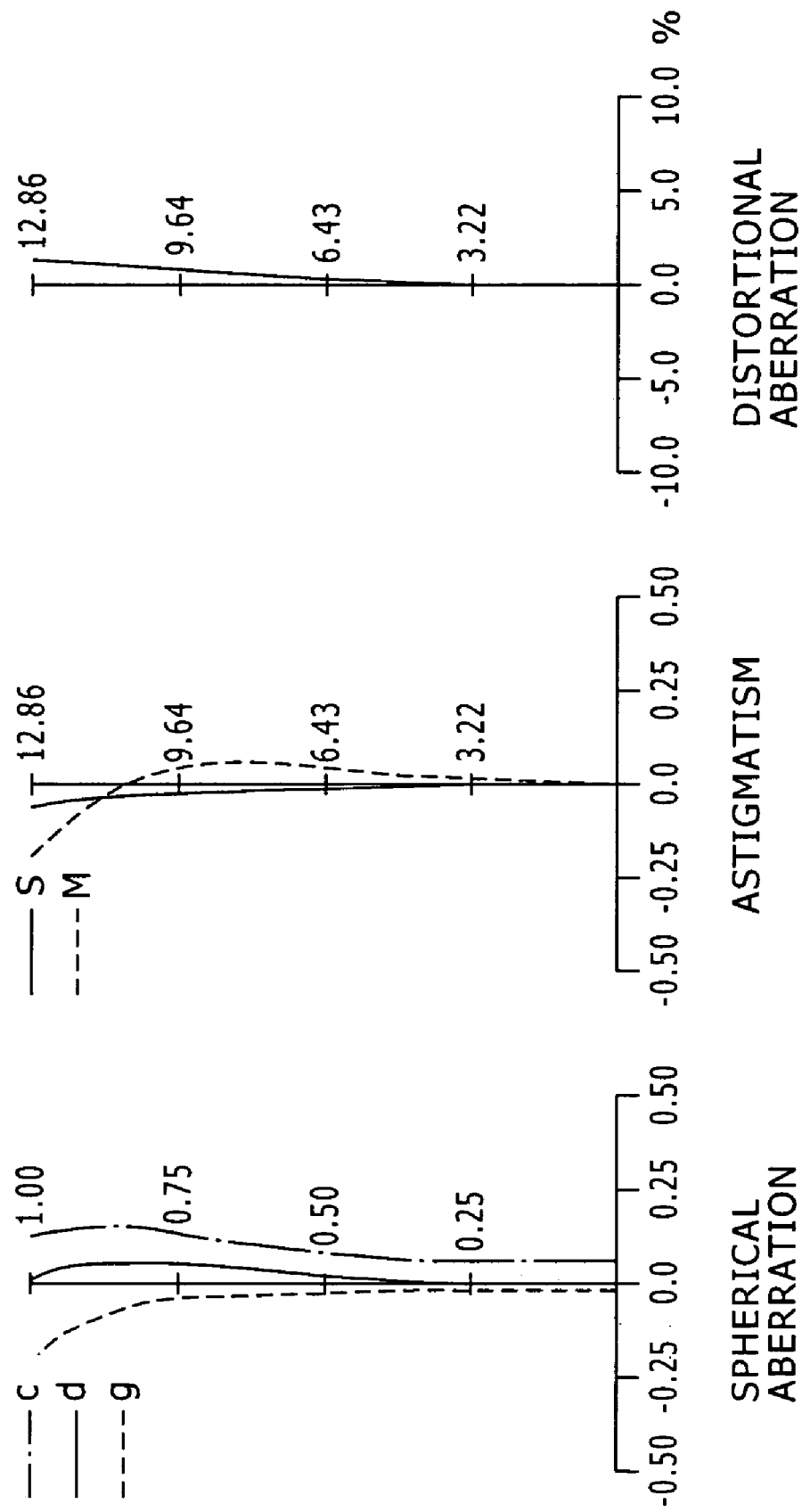
FIG. 4 is a similar view but illustrating a spherical aberration, an astigmatism and a distortional aberration at the telephoto end of the zoom lens according to the numerical example 1.
Figure 5:
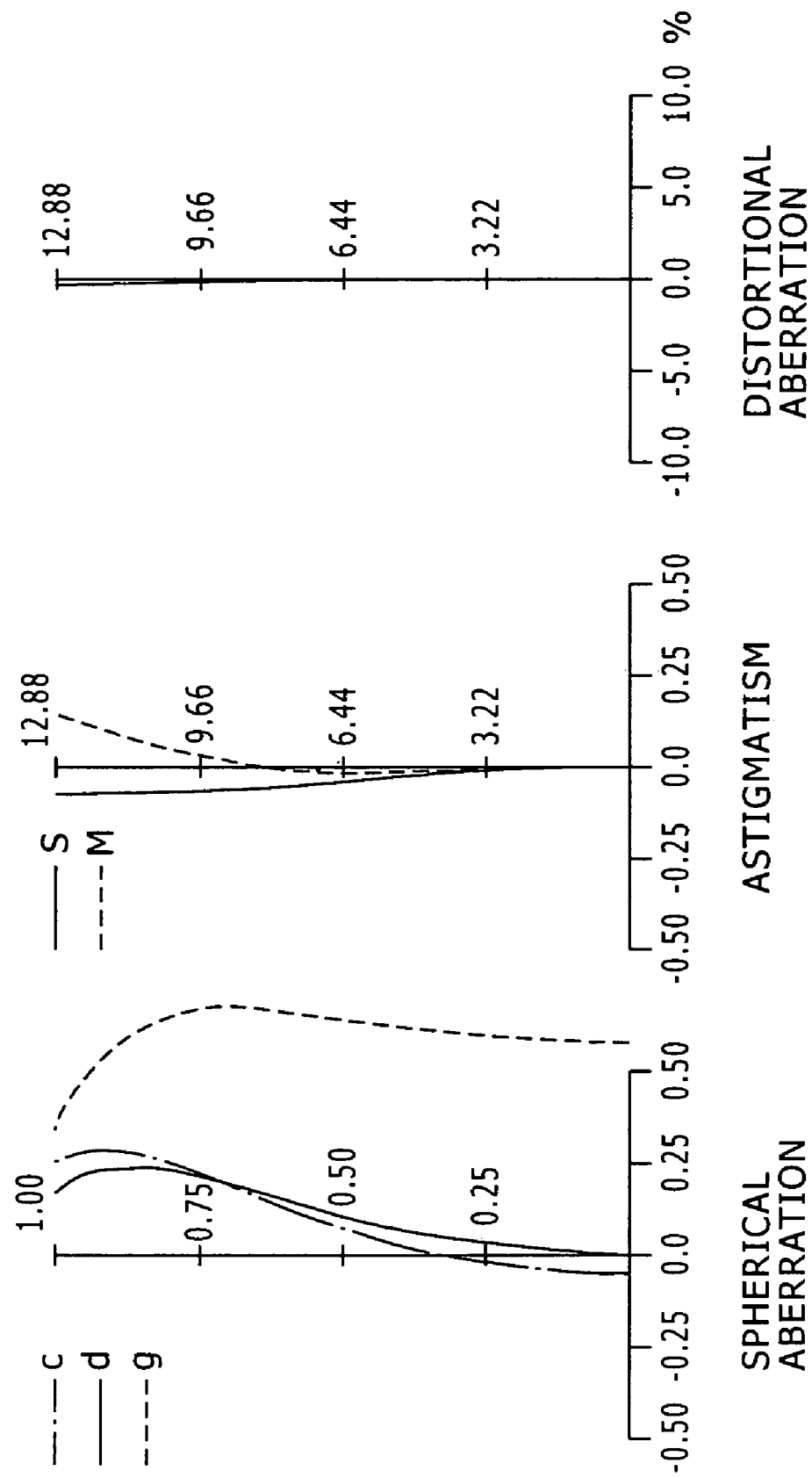
FIG. 5 is a similar view but illustrating a spherical aberration, an astigmatism and a distortional aberration of the zoom lens where the magnifying power of the zoom lens according to the numerical example 1 in the macro mode is 0.6.

FIGS. 2 to 4 illustrate various aberrations upon focusing on infinity in the numerical value example 1. Particularly, FIG. 2 illustrates a spherical aberration, an astigmatism and a distortional aberration at the wide angle end (f=14.726) of the zoom lens; FIG. 3 illustrates those at the intermediate focal distance (f=33.938); and FIG. 4 illustrates those at the telephoto end (f=78.218). Further, FIG. 5 illustrates a spherical aberration, an astigmatism and a distortional aberration of the zoom lens where the magnifying power of the zoom lens in the macro mode is 0.6. It is to be noted that, in FIGS. 2 to 5, for the spherical aberration, the axis of ordinate indicates the ratio to the F value in the open state, and the axis of abscissa indicates the defocus amount, and a solid line indicates the spherical aberration with regard to the d-line; an alternate long and short dash line indicates the spherical aberration with regard to the C-line; and a broken line indicates the spherical aberration with regard to the g-line. For the astigmatism, the axis of ordinate indicates the image height and the axis of abscissa indicates the focus amount, and a solid line indicates a sagittal image surface while a broken line indicates a meridional image surface. For the distortional aberration, the axis of ordinate indicates the image height while the axis of abscissa indicates the percentage.

Figure 6:
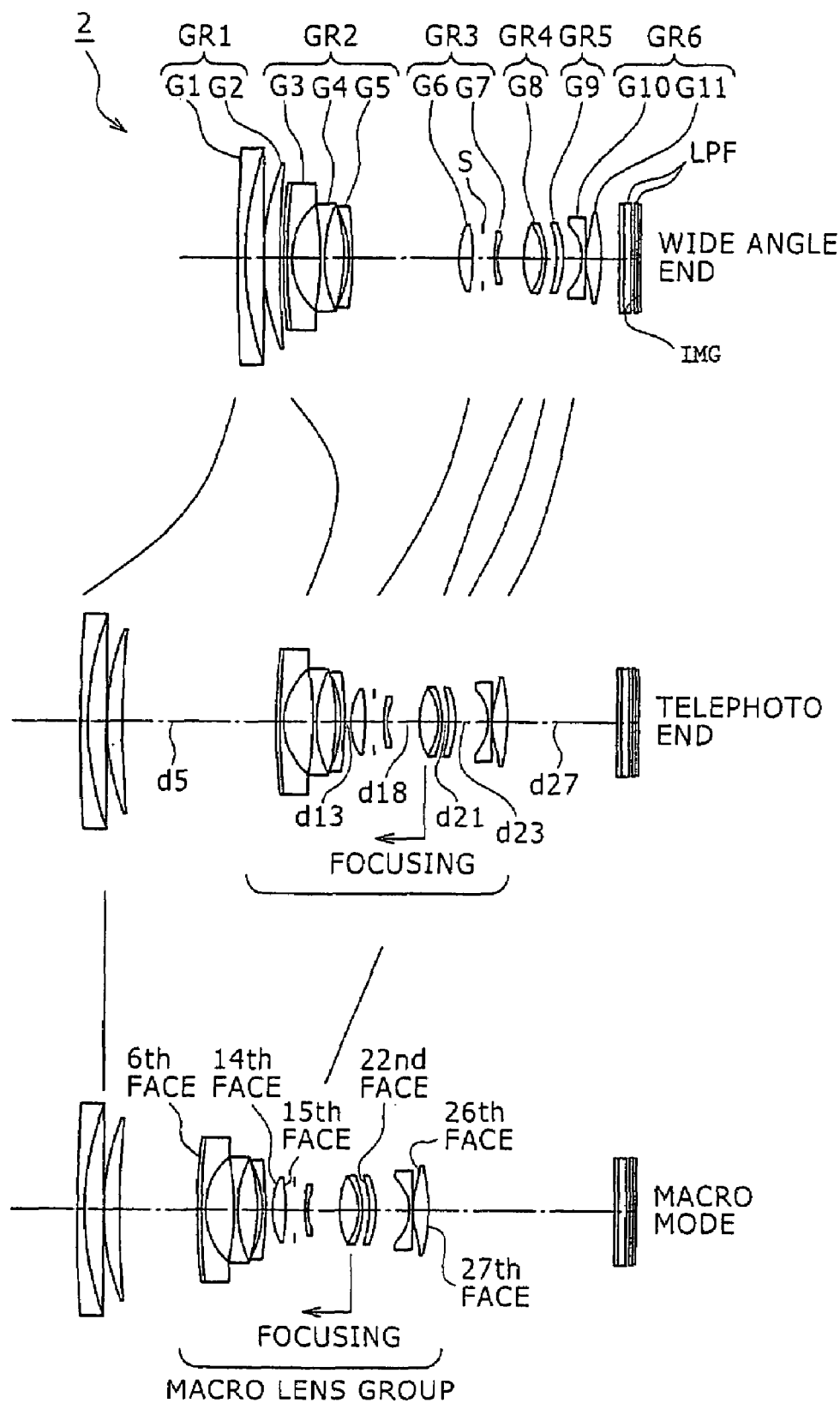
FIG. 6 is a schematic view showing a lens configuration of another zoom lens to which the present invention is applied.

FIG. 6 shows a configuration of a zoom lens according to a second embodiment of the present invention. Referring to FIG. 6, the zoom lens 2 shown includes a first lens group GR1 having a positive refracting power, a second lens group GR2 having a negative refracting power, a third lens group GR3 having a positive refracting power, a fourth lens group GR4 having a positive refracting power, a fifth lens group GR5 having a low refracting power, and a sixth lens group GR6 having a negative refracting power, disposed in order from the object side. Upon power variation, the lens groups move on the optical axis as indicated by a solid line arrow mark in FIG. 6.

The first lens group GR1 includes a cemented lens G1 composed of a negative lens and a positive lens, and a positive lens G2. The second lens group GR2 includes a negative lens G3 having a composite aspheric face on the object side, a cemented lens G4 of a negative lens and a positive lens, and a negative lens G5. The third lens group GR3 includes a positive lens G6 having an aspheric face on the opposite sides thereof, an iris S and a negative lens G7. The fourth lens group GR4 includes a cemented lens G8 of a positive lens and a negative lens. The fifth lens group GR5 includes a lens G9 having a low refracting power and having an aspheric face on the object side. The sixth lens group GR6 includes a negative lens G10, and a positive lens G11 having an aspheric face on the opposite sides thereof.

The zoom lens 2 can be placed into the macro mode in which it can be focused at a shorter distance than the ordinary image pickup region by moving the lens groups from the second lens group GR2 to the sixth lens group GR6 (macro lens group) integrally with each other toward the object side from the positions of them in the telephoto end state of the zoom lens 2 shown at an intermediate stage in FIG. 6 to a state shown at a lower stage in FIG. 6.

Table 5 indicates values of several dimensions of the numerical value example 2 where particular numerical values are applied to the zoom lens 2 of the second embodiment described above.

TABLE 5

| Face No. | R | D | Nd | Vd |
| --- | --- | --- | --- | --- |
| 1 | 500.000 | 1.700 | 1.8467 | 23.785 |
| 2 | 89.433 | 4.558 | 1.7292 | 54.674 |
| 3 | 30368.607 | 0.200 | | |

TABLE 5-continued

| Face No. | R | | D | Nd | Vd |
|---|---|---|---|---|---|
| 4 | 63.257 | | 4.175 | 1.8350 | 42.984 |
| 5 | 236.092 | | Variable | | |
| 6 | −893.765 | ASP | 0.200 | 1.5361 | 41.200 |
| 7 | 165.419 | | 1.500 | 1.8350 | 42.984 |
| 8 | 16.144 | | 7.827 | | |
| 9 | −66.815 | | 1.100 | 1.8350 | 42.984 |
| 10 | 31.665 | | 5.303 | 1.8467 | 23.785 |
| 11 | −41.056 | | 1.173 | | |
| 12 | −30.000 | | 1.100 | 1.8350 | 42.984 |
| 13 | −67.131 | | Variable | | |
| 14 | 16.904 | ASP | 3.476 | 1.6180 | 63.396 |
| 15 | −42.387 | ASP | 2.500 | | |
| Iris | INFINITY | | 3.000 | | |
| 17 | 30.101 | | 0.900 | 1.9229 | 20.880 |
| 18 | 15.438 | | Variable | | |
| 19 | 24.046 | | 4.988 | 1.4970 | 81.608 |
| 20 | −12.476 | | 0.900 | 1.8350 | 42.984 |
| 21 | −19.662 | | Variable | | |
| 22 | −18.069 | ASP | 1.600 | 1.8061 | 40.734 |
| 23 | −24.363 | | Variable | | |
| 24 | −11.833 | | 1.000 | 1.7292 | 54.674 |
| 25 | −343.116 | | 0.200 | | |
| 26 | 20.764 | ASP | 3.700 | 1.8340 | 37.345 |
| 27 | −120.143 | ASP | Variable | | |
| 28 | INFINITY | | 1.200 | 1.5168 | 64.198 |
| 29 | INFINITY | | 1.620 | 1.5523 | 63.424 |
| 30 | INFINITY | | 1.000 | 1.0000 | |
| 31 | INFINITY | | 0.500 | 1.5567 | 58.649 |
| 32 | INFINITY | | 1.000 | 1.0000 | |
| IMG | INFINITY | | | | |

The focal length f, F number Fno and half angle of view ω at the wide angle end, at an intermediate focal length between the wide angle end and the telephoto end and at the telephoto end in the numerical value example 2 are indicated in Table 6.

TABLE 6

| F | 14.730 | 33.943 | 78.213 |
|---|---|---|---|
| Fno. | 2.887 | 4.214 | 4.965 |
| ω | 42.240 | 20.929 | 9.187 |

In the zoom lens 2, upon power variation, the lens group distances d5, d13, d18, d21, d23 and d27 vary. On the other hand, upon focusing, the distance d18 between the third lens group GR3 and the fourth lens group GR4 and the distance d21 between the fourth lens group GR4 and the fifth lens group GR5 vary. Thus, values of the variable distances given above upon focusing at the wide angle end (f=14.730), intermediate focal distance (f=33.943) and telephoto end (f=78.213) upon focusing on infinity and upon focusing at the wide angle end, intermediate focal distance and telephoto end upon focusing at a short distance (distance to the object=0.35 m) in an ordinary image pickup region and upon focusing on the greatest distance (0.57 m) and on the smallest distance (0.23 m) in the macro region in the numerical value example 2 are indicated in Table 7 together with the magnifying power.

TABLE 7

| | Ordinary image pickup region | | | | | | Macro region | |
|---|---|---|---|---|---|---|---|---|
| f | 14.730 | 33.943 | 78.213 | | | | | |
| Object distance | Infinite | Infinite | Infinite | 0.35 m | 0.35 m | 0.35 m | 0.57 m | 0.23 m |
| Magnifying power | 0.000 | 0.000 | 0.000 | 0.055 | 0.128 | 0.275 | 0.150 | 0.600 |
| d5 | 1.000 | 8.134 | 39.832 | 1.000 | 8.134 | 39.832 | 20.440 | 20.440 |
| d13 | 27.079 | 6.722 | 1.000 | 27.079 | 6.722 | 1.000 | 1.000 | 1.000 |
| D18 | 6.737 | 5.767 | 8.220 | 6.288 | 4.330 | 2.559 | 8.220 | 2.559 |
| d21 | 2.984 | 3.953 | 1.500 | 3.432 | 5.391 | 7.161 | 1.500 | 7.161 |
| d23 | 5.211 | 7.054 | 8.548 | 5.211 | 7.054 | 8.548 | 8.548 | 8.548 |
| d27 | 5.257 | 18.692 | 29.167 | 5.257 | 18.692 | 29.167 | 48.559 | 48.559 |

In the zoom lens 2, each of the 6th, 14th, 15th, 22nd, 26th and 27th faces is formed from an aspheric face. Therefore, the aspheric surface coefficient of each of the faces in the numerical value example 2 is indicated in Table 8 together with a conic constant.

TABLE 8

| Face No. | K | $A^4$ | $A^6$ | $A^8$ | $A^{10}$ |
|---|---|---|---|---|---|
| 6 | 0.000E+00 | 1.827E−05 | −3.819E−08 | 5.78E−11 | −5.15E−14 |
| 14 | 0.000E+00 | −3.253E−05 | −3.77E−08 | 3.48E−10 | −7.49E−12 |
| 15 | 0.000E+00 | 1.411E−05 | 2.309E−08 | −5.17E−10 | 0.00E+00 |
| 22 | 0.000E+00 | 1.125E−04 | −4.59E−07 | 2.68E−09 | 7.51E−14 |
| 26 | 0.000E+00 | −1.580E−04 | 6.55E−07 | −4.60E−09 | 1.21E−11 |
| 27 | 0.000E+00 | −2.90E−05 | −2.00E−07 | 0.00E+00 | 0.00E+00 |

Figure 7:
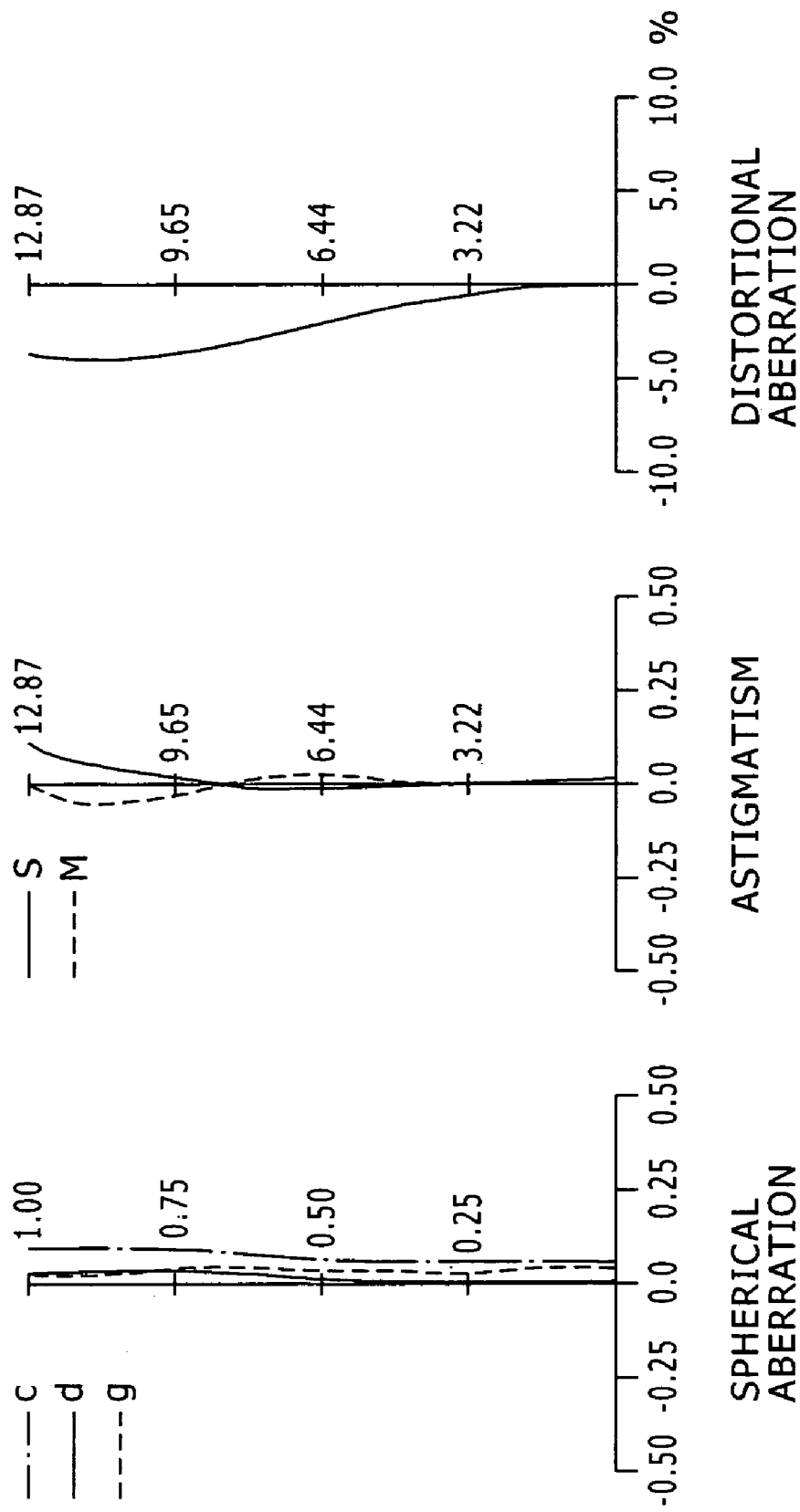
FIG. 7 is a diagrammatic view illustrating a spherical aberration, an astigmatism and a distortional aberration at the wide angle end of the zoom lens in an infinitely focused state according to a numerical example 2 wherein particular numerical values are applied to the zoom lens of FIG. 6.
Figure 8:
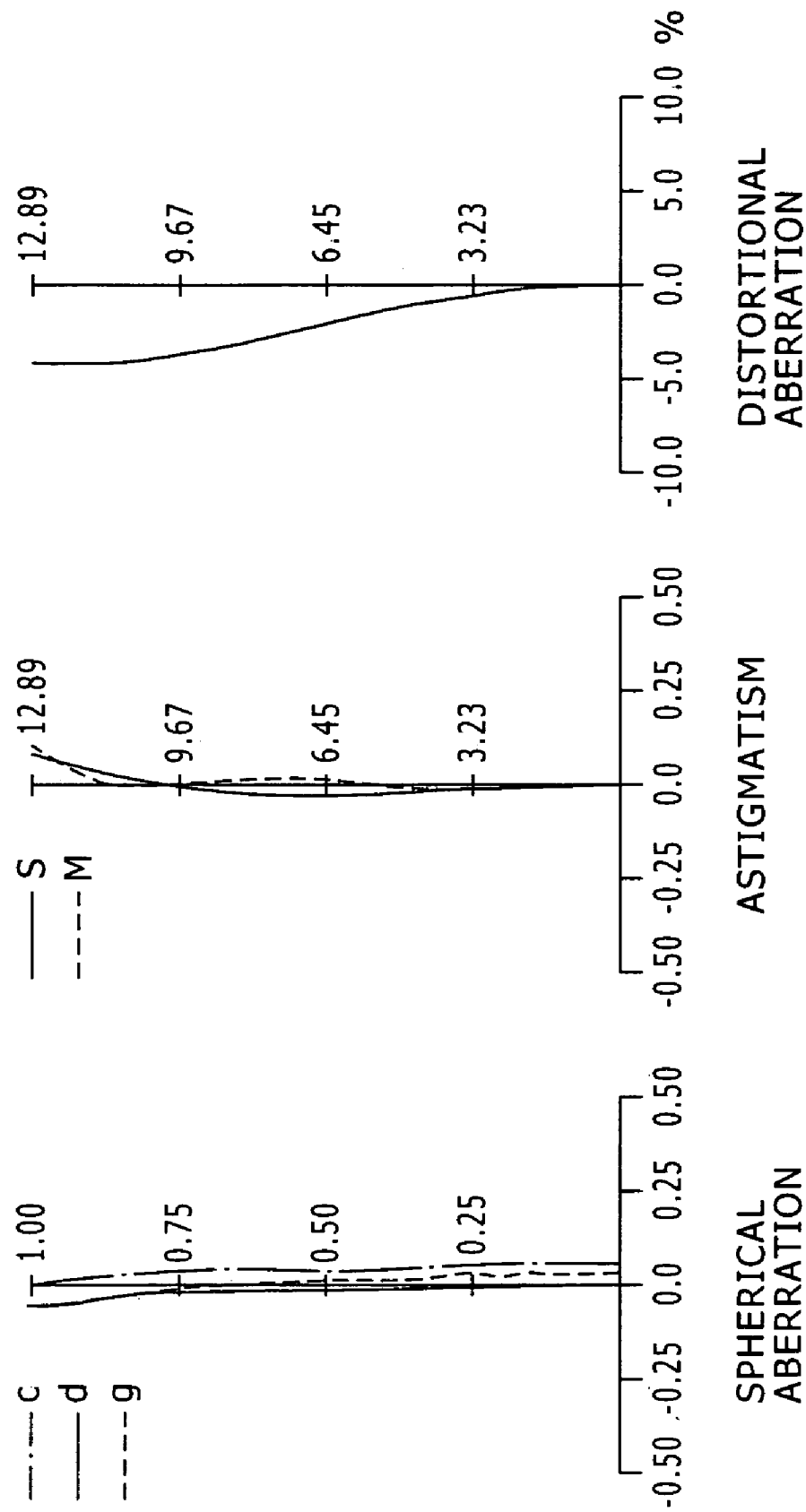
FIG. 8 is a similar view but illustrating a spherical aberration, an astigmatism and a distortional aberration at an intermediate focal length according to the numerical example 2.
Figure 9:
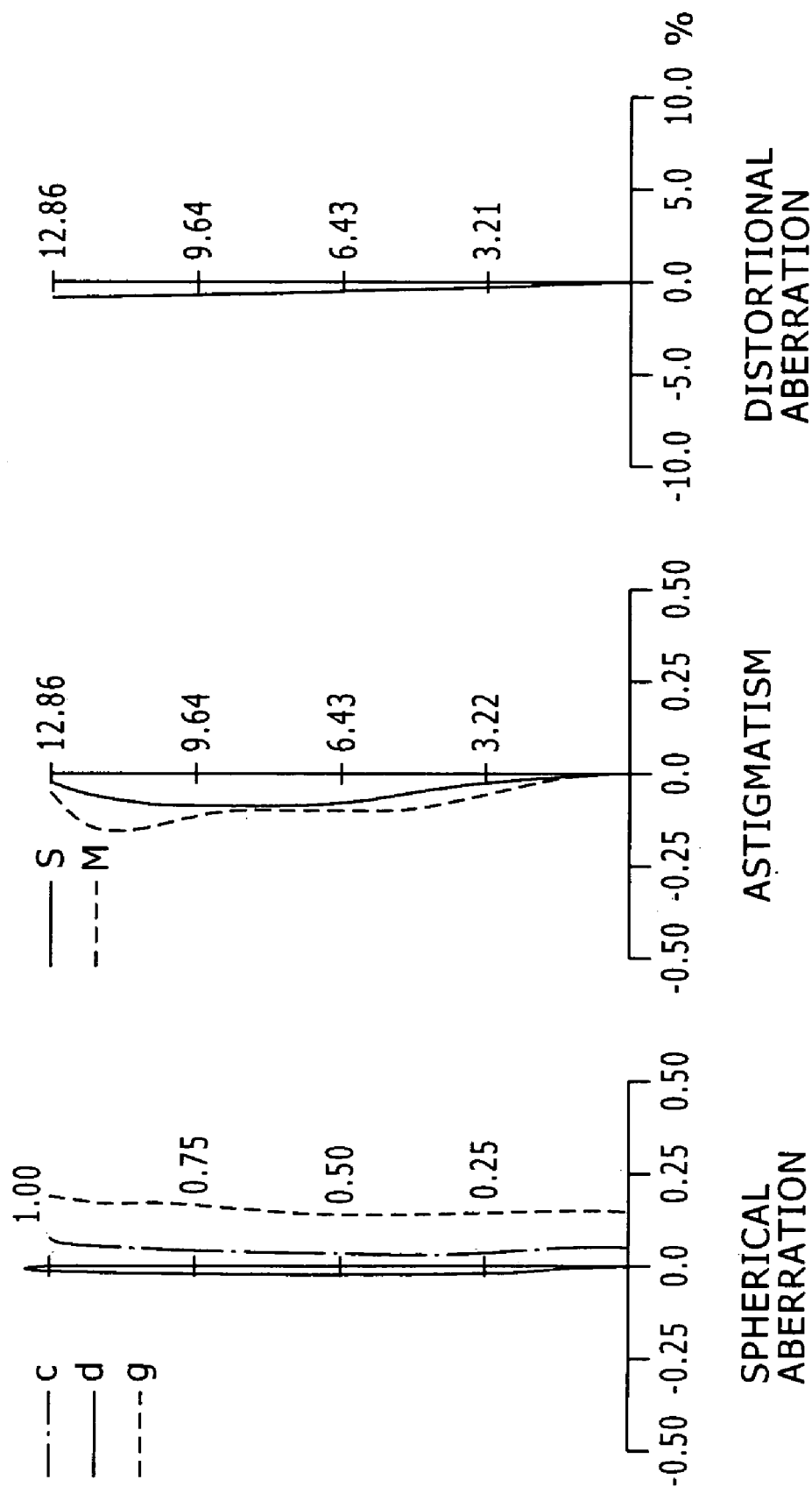
FIG. 9 is a similar view but illustrating a spherical aberration, an astigmatism and a distortional aberration at the telephoto end of the zoom lens according to the numerical example 2.
Figure 10:
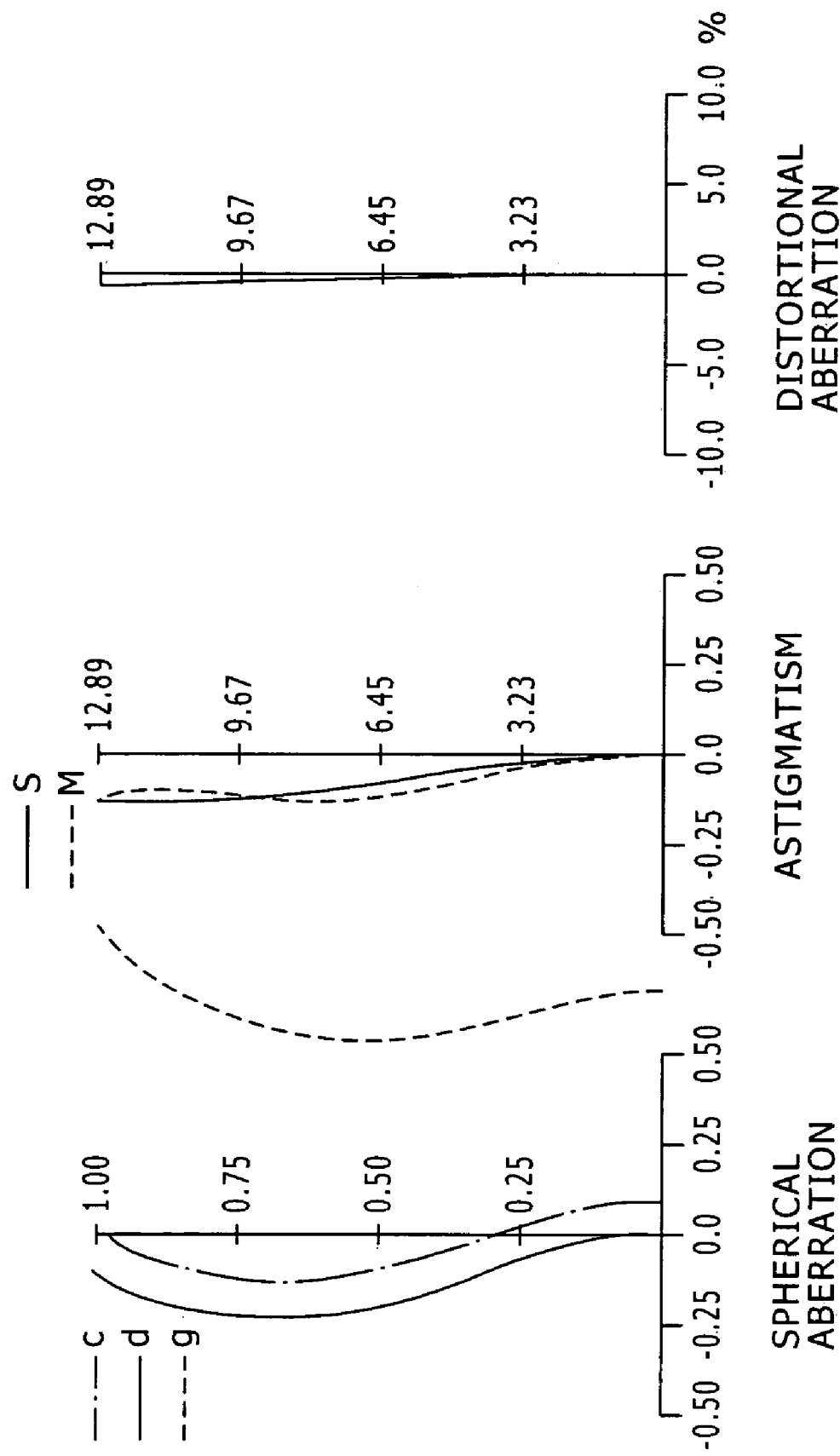
FIG. 10 is a similar view but illustrating a spherical aberration, an astigmatism and a distortional aberration of the zoom lens where the magnifying power of the zoom lens according to the numerical example 2 in the macro mode is 0.6.

FIGS. 7 to 9 illustrate various aberrations upon focusing on infinity in the numerical value example 2. Particularly, FIG. 7 illustrates a spherical aberration, an astigmatism and a distortional aberration at the wide angle end (f=14.730) of the zoom lens; FIG. 8 illustrates those at the intermediate focal distance (f=33.943); and FIG. 9 illustrates those at the telephoto end (f=78.213). Further, FIG. 10 illustrates a spherical aberration, an astigmatism and a distortional aberration of the zoom lens where the magnifying power of the zoom lens in the macro mode is 0.6. It is to be noted that, in FIGS. 7 to 10, for the spherical aberration, the axis of ordinate indicates the ratio to the F value in the open state, and the axis of abscissa indicates the defocus amount, and a solid line indicates the spherical aberration with regard to the d-line; an alternate long and short dash line indicates the spherical aberration with regard to the C-line; and a broken line indicates the spherical aberration with regard to the g-line. For the astigmatism, the axis of ordinate indicates the image height and the axis of abscissa indicates the focus amount, and a solid line indicates a sagittal image surface while a broken line indicates a meridional image surface. For the distortional aberration, the axis of ordinate indicates the image height while the axis of abscissa indicates the percentage.

Figure 11:
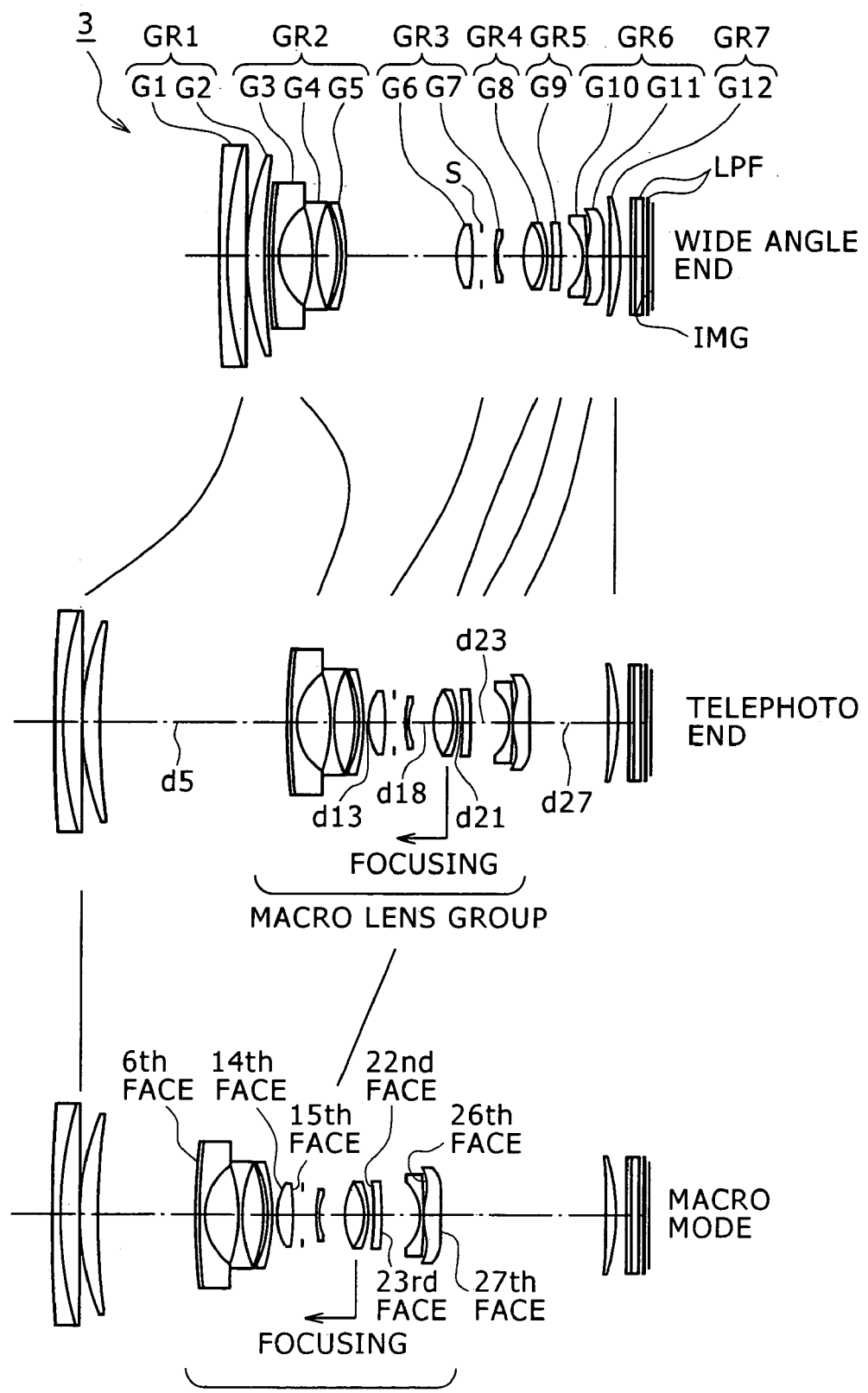
FIG. 11 is a schematic view showing a lens configuration of a further zoom lens to which the present invention is applied.

FIG. 11 shows a configuration of a zoom lens according to a third embodiment of the present invention. Referring to FIG. 11, the zoom lens 3 shown includes a first lens group GR1 having a positive refracting power, a second lens group GR2 having a negative refracting power, a third lens group GR3 having a positive refracting power, a fourth lens group GR4 having a positive refracting power, a fifth lens group GR5 having a low refracting power, a sixth lens group GR6 having a negative refracting power, and a seventh lens group GR7 having a positive refracting power, disposed in order from the object side. Upon power variation, the lens groups except the seventh lens group GR7 move on the optical axis as indicated by a solid line arrow mark in FIG. 11.

The first lens group GR1 includes a cemented lens G1 composed of a negative lens and a positive lens, and a positive lens G2. The second lens group GR2 includes a negative lens G3 having a composite aspheric face on the object side, a cemented lens G4 of a negative lens and a positive lens, and a negative lens G5. The third lens group GR3 includes a positive lens G6 having an aspheric face on the opposite sides thereof, an iris S and a negative lens G7. The fourth lens group GR4 includes a cemented lens G8 of a positive lens and a negative lens. The fifth lens group GR5 includes a lens G9 having a low refracting power and having an aspheric face on the opposite sides thereof. The sixth lens group GR6 includes a negative lens G10, and a positive lens G11 having an aspheric face on the opposite sides thereof. The seventh lens group GR7 includes a positive single lens G12 which is fixed upon power variation.

The zoom lens 3 can be placed into the macro mode in which it can be focused at a shorter distance than the ordinary image pickup region by moving the lens groups from the second lens group GR2 to the sixth lens group GR6 (macro lens group) integrally toward the object side from the positions of them in the telephoto end state of the zoom lens 2 shown at an intermediate stage in FIG. 11 to a state shown at a lower stage in FIG. 11.

Table 9 indicates values of several dimensions of the numerical value example 3 where particular numerical values are applied to the zoom lens 3 of the third embodiment described above.

TABLE 9

| Face No. | R | D | Nd | Vd |
|---|---|---|---|---|
| 1 | 500.000 | 1.700 | 1.8467 | 23.785 |
| 2 | 96.989 | 4.500 | 1.7292 | 54.674 |
| 3 | 2473.469 | 0.200 | | |
| 4 | 64.654 | 4.590 | 1.8350 | 42.984 |
| 5 | 200.000 | Variable | | |
| 6 | −3827.285 ASP | 0.200 | 1.5361 | 41.200 |
| 7 | 145.379 | 1.500 | 1.8350 | 42.984 |
| 8 | 16.013 | 8.791 | | |
| 9 | −40.623 | 1.100 | 1.8350 | 42.984 |
| 10 | 40.924 | 5.442 | 1.8467 | 23.785 |
| 11 | −34.735 | 0.861 | | |
| 12 | −30.382 | 1.100 | 1.8350 | 42.984 |
| 13 | −46.217 | Variable | | |
| 14 | 17.600 ASP | 3.966 | 1.6180 | 63.396 |
| 15 | −37.418 ASP | 2.500 | | |
| Iris | INFINITY | 3.000 | | |
| 17 | 34.527 | 0.900 | 1.9229 | 20.880 |
| 18 | 15.915 | Variable | | |
| 19 | 22.526 | 4.791 | 1.4970 | 81.608 |
| 20 | −13.749 | 0.900 | 1.8350 | 42.984 |
| 21 | −21.169 | Variable | | |
| 22 | −24.258 ASP | 1.600 | 1.8061 | 40.734 |
| 23 | −43.741 ASP | Variable | | |
| 24 | −11.063 | 1.000 | 1.6833 | 57.744 |
| 25 | −58.348 | 0.200 | | |
| 26 | 28.135 ASP | 4.000 | 1.8340 | 37.345 |
| 27 | −10000.000 ASP | Variable | | |
| 28 | −468.799 | 2.700 | 1.8467 | 23.785 |
| 29 | −51.710 | 2.755 | 1.0000 | |
| 30 | INFINITY | 1.200 | 1.5168 | 64.198 |
| 31 | INFINITY | 1.620 | 1.5523 | 63.424 |
| 32 | INFINITY | 1.000 | 1.0000 | |
| 33 | INFINITY | 0.500 | 1.5567 | 58.649 |
| 34 | INFINITY | 1.000 | 1.0000 | |
| IMG | INFINITY | | | |

The focal length f, F number Fno and half angle of view ω at the wide angle end, at an intermediate focal length between the wide angle end and the telephoto end and at the telephoto end in the numerical value example 3 are indicated in Table 10.

TABLE 10

| f | 14.730 | 33.943 | 78.214 |
|---|---|---|---|
| Fno. | 2.887 | 3.995 | 4.927 |
| ω | 42.169 | 20.500 | 9.183 |

In the zoom lens 3, upon power variation, the lens group distances d5, d13, d18, d21, d23 and d27 vary. On the other hand, upon focusing, the distance d18 between the third lens group GR3 and the fourth lens group GR4 and the distance d21 between the fourth lens group GR4 and the fifth lens group GR5 vary. Thus, values of the variable distances given above upon focusing at the wide angle end (f=14.730), intermediate focal distance (f=33.943) and telephoto end (f=78.214) upon focusing on infinity and upon focusing at the wide angle end, intermediate focal distance and telephoto end upon focusing at a short distance (distance to the object 0.35 m) in the ordinary image pickup region and upon focusing on the greatest distance (0.70 m) and on the smallest distance (0.23 m) in the macro region in the numerical value example 3 are indicated in Table 11 together with the magnifying power.

TABLE 11

|  | Ordinary image pickup region | | | | | | Macro region | |
| --- | --- | --- | --- | --- | --- | --- | --- | --- |
| f | 14.730 | 33.943 | 78.214 | | | | | |
| Object distance | Infinite | Infinite | Infinite | 0.35 m | 0.35 m | 0.35 m | 0.70 m | 0.23 m |
| Magnifying power | 0.000 | 0.000 | 0.000 | 0.056 | 0.123 | 0.255 | 0.125 | 0.600 |
| d5 | 1.000 | 18.887 | 46.604 | 1.000 | 18.887 | 46.604 | 24.951 | 24.951 |
| d13 | 28.801 | 9.803 | 1.000 | 28.801 | 9.803 | 1.000 | 1.000 | 1.000 |
| d18 | 6.662 | 6.048 | 6.651 | 6.226 | 4.745 | 2.100 | 6.651 | 2.100 |
| d21 | 1.488 | 2.103 | 1.500 | 1.925 | 3.406 | 6.051 | 1.500 | 6.051 |
| d23 | 6.253 | 7.903 | 10.202 | 6.253 | 7.903 | 10.202 | 10.202 | 10.202 |
| d27 | 1.500 | 11.559 | 19.747 | 1.500 | 11.559 | 19.747 | 41.401 | 41.401 |

In the zoom lens 3, each of the 6th, 14th, 15th, 22nd, 23rd, 26th and 27th faces is formed from an aspheric face. Therefore, the aspheric surface coeffcient of each of the faces in the numerical value example 3 is indicated in Table 12 together with a conic constant.

TABLE 12

| Face No. | K | $A^4$ | $A^6$ | $A^8$ | $A^{10}$ |
| --- | --- | --- | --- | --- | --- |
| 6 | 0.000E+00 | 1.80E−05 | −3.55E−08 | 4.58E−11 | −3.32E−14 |
| 14 | 0.000E+00 | −3.16E−05 | −4.92E−08 | 2.70E−10 | −3.21E−12 |
| 15 | 0.000E+00 | 1.63E−05 | −2.10E−08 | −5.78E−12 | 0.00E+00 |
| 22 | 0.000E+00 | 1.95E−04 | −7.12E−07 | 9.03E−09 | −3.19E−11 |
| 23 | 0.000E+00 | 1.02E−04 | −1.25E−07 | 3.73E−09 | 0.00E+00 |
| 26 | 0.000E+00 | −1.87E−04 | 3.94E−07 | −4.61E−09 | 1.56E−11 |
| 27 | 0.000E+00 | −9.26E−05 | −1.70E−07 | 0.00E+00 | 0.00E+00 |

Figure 12:
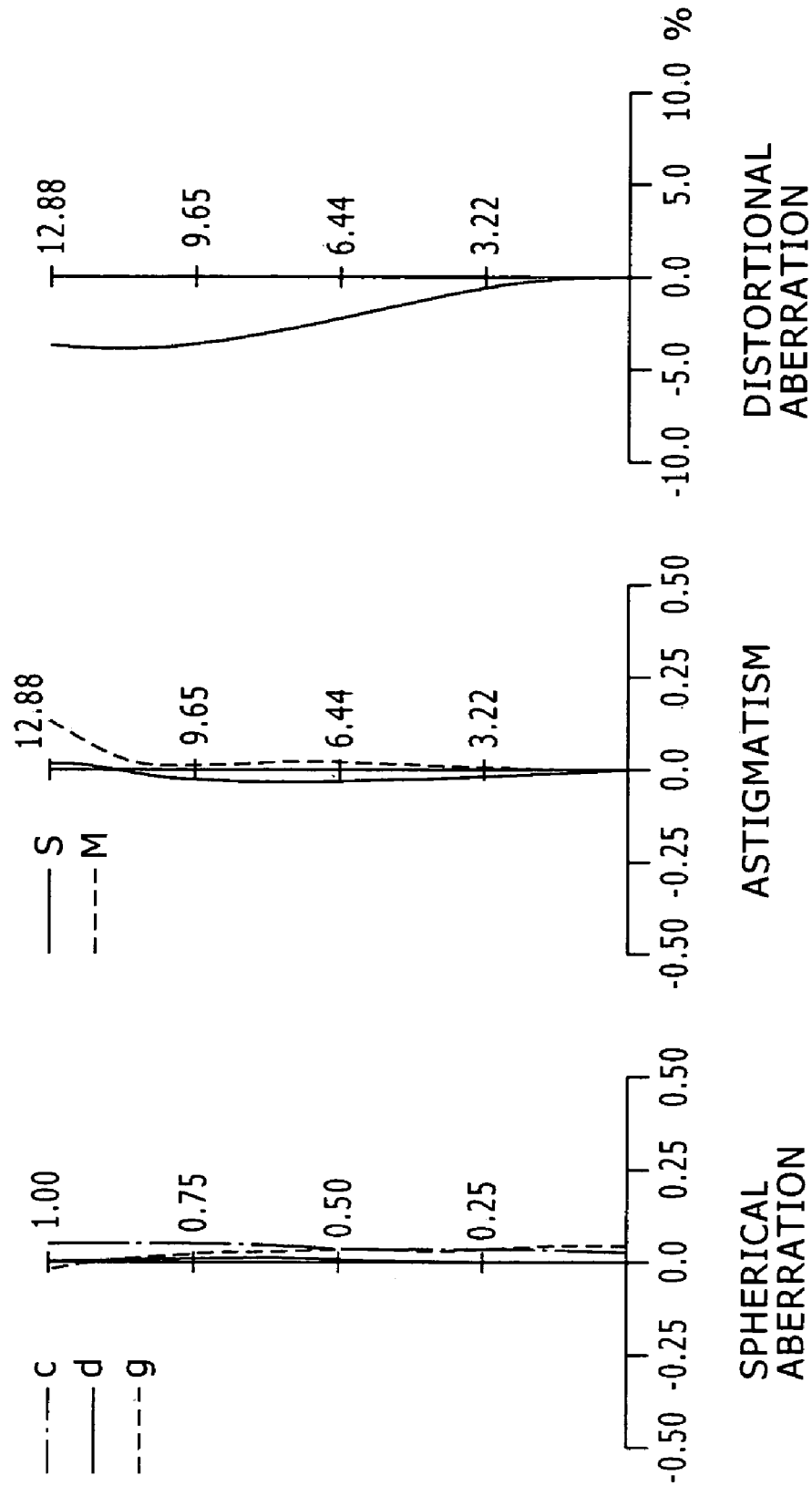
FIG. 12 is a diagrammatic view illustrating a spherical aberration, an astigmatism and a distortional aberration at the wide angle end of the zoom lens in an infinitely focused state according to a numerical example 3 wherein particular numerical values are applied to the zoom lens of FIG. 11.
Figure 13:
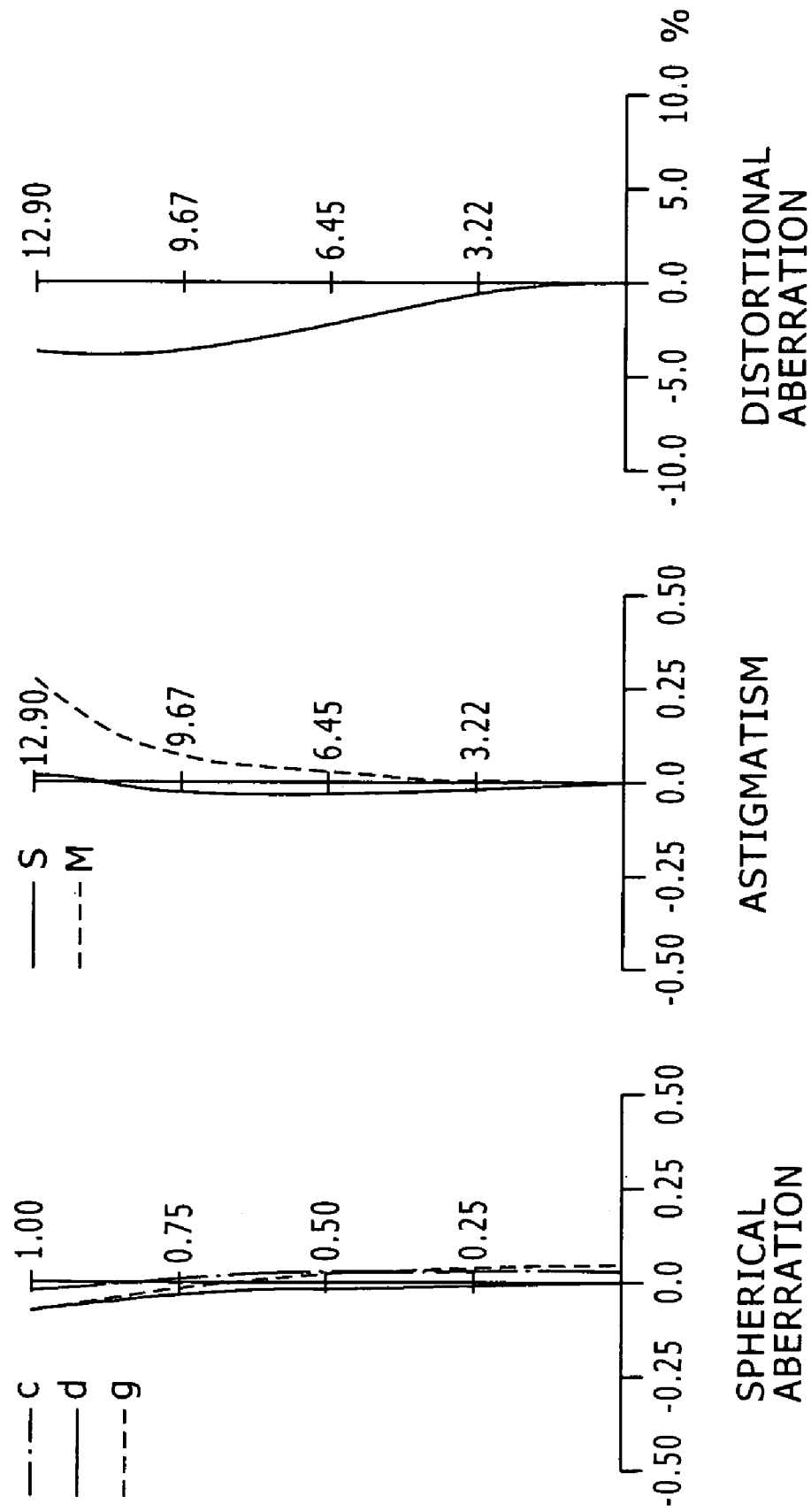
FIG. 13 is a similar view but illustrating a spherical aberration, an astigmatism and a distortional aberration at an intermediate focal length according to the numerical example 3.
Figure 14:
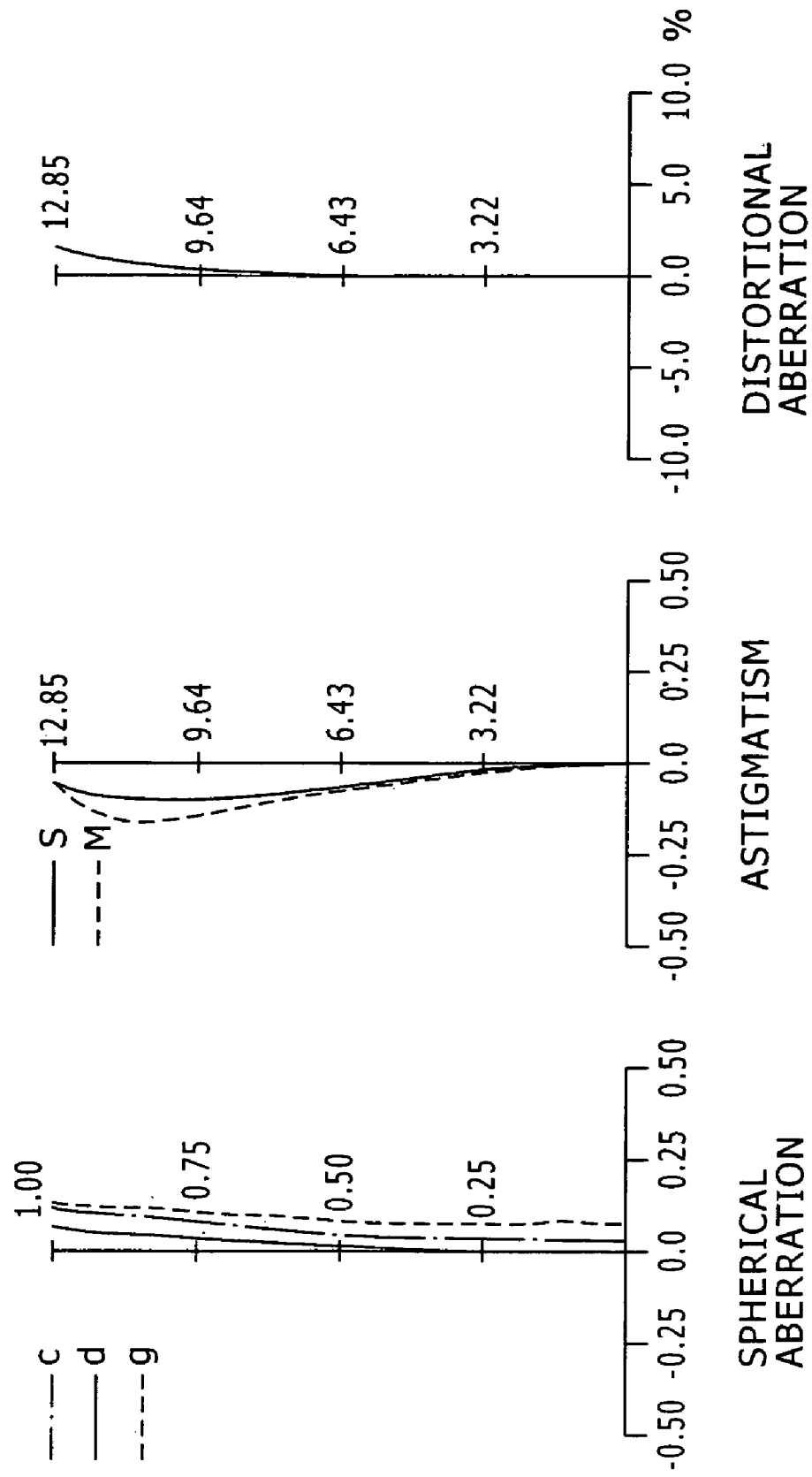
FIG. 14 is a similar view but illustrating a spherical aberration, an astigmatism and a distortional aberration at the telephoto end of the zoom lens according to the numerical example 3.
Figure 15:
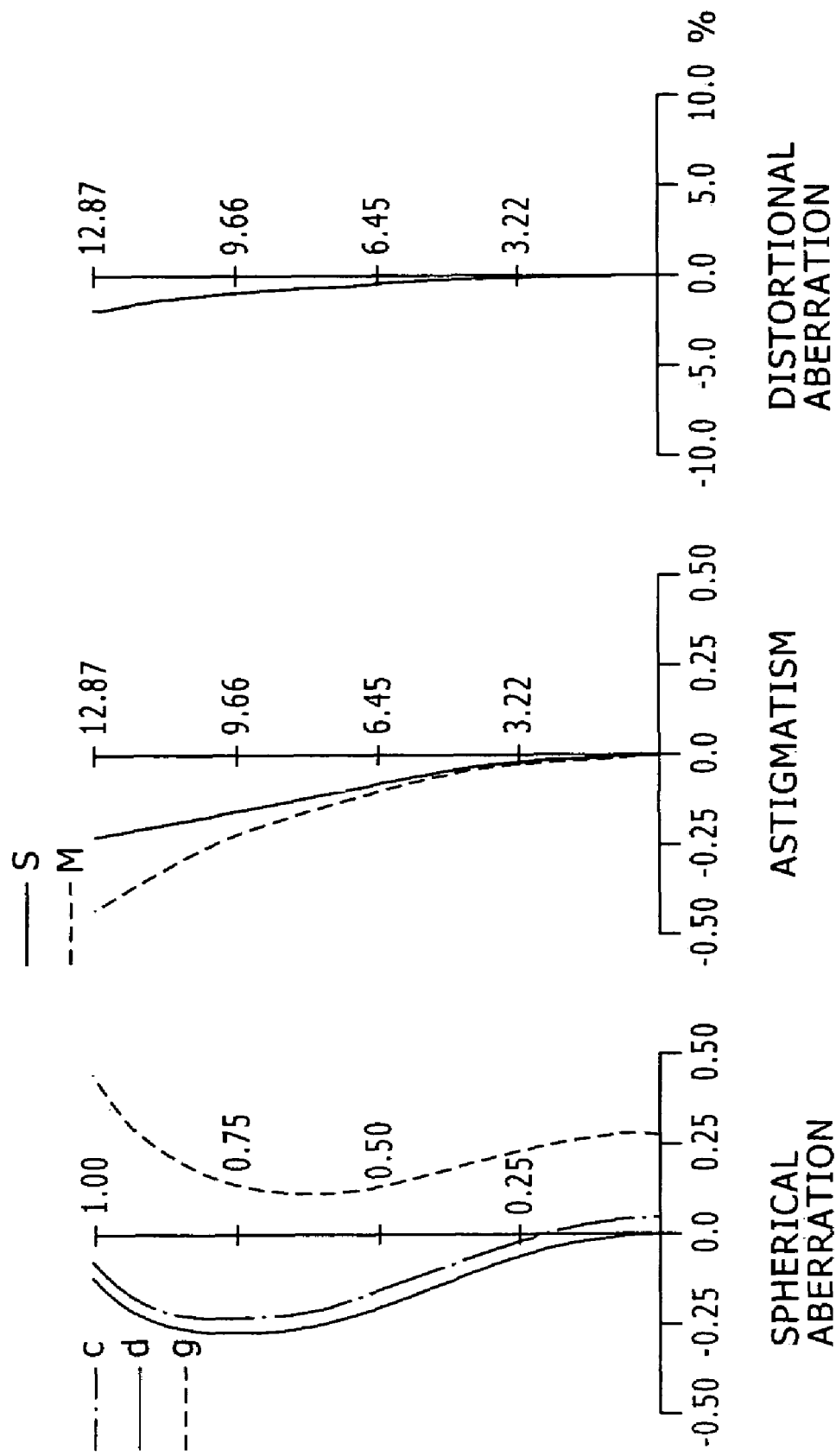
FIG. 15 is a similar view but illustrating a spherical aberration, an astigmatism and a distortional aberration of the zoom lens where the magnifying power of the zoom lens according to the numerical example 1 in the macro mode is 0.6.

FIGS. 12 to 14 illustrate various aberrations upon focusing on infinity in the numerical value example 3. Particularly, FIG. 12 illustrates a spherical aberration, an astigmatism and a distortional aberration at the wide angle end (f=14.730) of the zoom lens; FIG. 13 illustrates those at an intermediate focal distance (f=33.943); and FIG. 14 illustrates those at the telephoto end (f=78.214). Further, FIG. 15 illustrates a spherical aberration, an astigmatism and a distortional aberration of the zoom lens where the magnifying power of the zoom lens in the macro mode is 0.6. It is to be noted that, in FIGS. 12 to 15, for the spherical aberration, the axis of ordinate indicates the ratio of the F value to the F value in the open state, and the axis of abscissa indicates the defocus amount, and a solid line indicates the spherical aberration with regard to the d-line; an alternate long and short dash line indicates the spherical aberration with regard to the C-line; and a broken line indicates the spherical aberration with regard to the g-line. For the astigmatism, the axis of ordinate indicates the image height and the axis of abscissa indicates the focus amount, and a solid line indicates a sagittal image surface while a broken line indicates a meridional image surface. For the distortional aberration, the axis of ordinate indicates the image height while the axis of abscissa indicates the percentage.

Corresponding values in the first to third numerical value examples described above to the conditional expressions (1) to (5) are indicated in Table 13.

TABLE 13

| | Conditional expression | | | | |
| --- | --- | --- | --- | --- | --- |
| Numerical value example | (1) f1/fT | (2) fmgT/fT | (3) \|Twbf/fw\| | (4) β mgT | (5) ff/fmgT |
| 1 | 1.328 | 0.160 | 0.704 | 1.346 | 2.498 |
| 2 | 1.264 | 0.162 | 0.721 | 1.301 | 2.252 |
| 3 | 1.412 | 0.184 | 0.469 | 1.385 | 1.929 |

As can be seen well from Table 13 above, the numerical value examples 1 to 3 satisfy the conditional expressions 1 to 5 and, and all of the aberrations at the wide angle end, the intermediate focal distance between the wide angle and the telephoto end and at the telephoto end upon normal image pickup and also in the macro mode are corrected in a well-balanced state.

Figure 16:
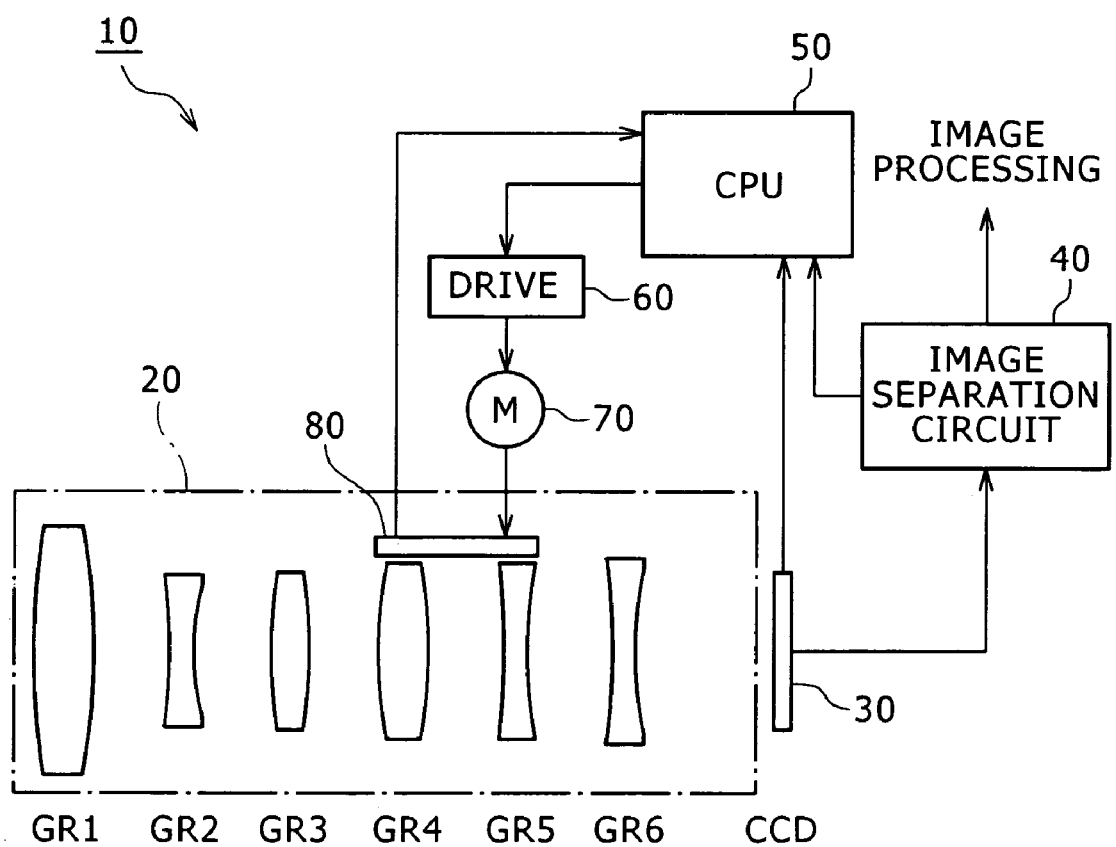
FIG. 16 is a block diagram showing an image pickup apparatus to which the present invention is applied.

FIG. 16 shows an image pickup apparatus to which the present invention is applied.

Referring to FIG. 16, the image pickup apparatus 10 shown includes a zoom lens 20, and an image pickup element 30 for converting an optical image formed by the zoom lens 20 into an electric signal. While the image pickup element 30 may be any of image pickup apparatus which use a photoelectric conversion element such as, for example, a CCD (Charge Coupled Device) element or a CMOS (Complementary Metal-Oxide Semiconductor) element, it may otherwise be formed from any other element only if it can convert an optical signal into an electric signal. Meanwhile, the zoom lens according to the present invention can be applied to the zoom lens 20, and in FIG. 16, the lens groups of the zoom lens 1 according to the first embodiment described hereinabove are each shown in a simplified form as a single lens. Naturally, not only the zoom lens according to the first embodiment but also the zoom lenses 2 and 3 according to the second and third embodiments of the present invention and any zoom lens of the present invention formed in any other form then those of the first to third embodiments disclosed in the present application can be applied to the zoom lens 20.

The image pickup apparatus 10 further includes a control circuit 50 which receives an external operation signal inputted thereto in response to an operation of, for example, a zoom button and performs various processes in response to the operation signal. For example, if a zooming instruction is inputted in response to an operation of the zoom button, then the control circuit 50 operates a driving section 70 through a driver circuit 60 to move the lens groups to respective predetermined positions in order to establish a focal distance condition in accordance with the instruction. Position information of the lens groups detected by respective sensors 80 is inputted to the control circuit 50 and thereafter referred to in order to produce an instruction signal to be outputted to the driver circuit 60. Further, the control circuit 50 checks a focus condition in response to a signal sent thereto from an image separation circuit 40 and controls so that an optimum focus condition may be obtained. It is to be noted that, while only one driving path is shown in FIG. 16 for the simplified illustration, actually the image pickup apparatus 10 includes a zooming system, a focusing system and an image mode changeover system separately from each other. Further, where the image pickup apparatus 10 further includes a blur correction function, it may further include a vibration preventing driving system for driving a blur correction lens (group). Further, some of the driving systems mentioned above may be formed as a common driving system. For example, the zooming system and the image pickup mode changeover system can be formed as a common driving system, for example, by using a common cam mechanism having a cam region to be used in the ordinary image pickup mode and another region to be used in the macro mode and providing a cam region for forming the macro mode ahead of a portion of the ordinary image pickup cam region corresponding to the telephoto end.

The image pickup apparatus 10 described above can assume various forms where it is formed as a particular product. For example, the image pickup apparatus 10 can be applied widely as a camera section to digital inputting/outputting apparatus such as, for example, digital still cameras, digital video cameras, portable telephone sets in which a camera is incorporated and PDAs (Personal Digital Assistants) in which a camera is incorporated.

While preferred embodiments of the present invention have been described using specific terms, such description is for illustrative purpose only, and it is to be understood that changes and variations may be made without departing from the spirit or scope of the following claims.

What is claimed is:

1. A zoom lens, comprising:
a first lens group having a positive refracting power;
a second lens group having a negative refracting power and serving as a movable group upon power variation of said zoom lens; and
a plurality of movable lens groups cooperable with said second group to form a macro lens group; wherein
said first lens group, second lens group and movable lens groups are disposed in order from an object side;
said movable lens groups include a single focusing group and an additional lens group disposed on the image side with respect to said single focusing group and having a negative refracting power; and
said zoom lens has a macro mode in which said zoom lens can be focused at a shorter distance than an ordinary region by moving said macro lens group integrally from a position at a telephoto end toward the object side while said first lens group is fixed at the telephotograph end;
wherein said ordinary region is a region where said single focusing group can focus on, upon power variations of said zoom lens; and
wherein, where the focal length of the entire lens system at the wide angle end is represented by fw and the back focus at the wide angle end is represented by Twbf, the expression $0.2 < |Twbf/fw| < 1.2$ is satisfied.

2. The zoom lens according to claim 1, wherein said plurality of movable lens groups include a third lens group having a positive refracting power, a fourth lens group having a positive refracting power and performing focusing when moved in a direction of an optical axis, a fifth lens group having a low refracting power and a sixth lens group having a negative refracting power, said second to sixth lens groups forming said macro lens group.

3. The zoom lens according to claim 1, wherein, where the focal length of the entire lens system at the telephoto end is represented by fT, the focal length of said first lens group is represented by f1, the focal length of said macro lens group at the telephoto end is represented by fmgT the following expressions (1) and (2) are satisfied:

$$0.6 < f1/fT < 2.0 \qquad (1)$$

$$0.1 < fmgT/tT0.4 \qquad (2).$$

4. The zoom lens according to claim 1, wherein, where the lateral magnification of the negative lenses included in said macro lens group at a macro position at which the magnifying power is highest is represented by βmgT, the following expression (4) is satisfied:

$$1.1 < \beta mgT < 2.0 \qquad (4).$$

5. The zoom lens according to claim 1, wherein, where the focal length of said focusing group is represented by ff and the focal length of said macro lens group at the telephoto end by fmgT, the following expression (5) is satisfied:

$$1.0 < ff/fmgT < 5.0 \qquad (5).$$

6. An image pickup apparatus, comprising:
a zoom lens; and
an image pickup element for converting an optical image formed by said zoom lens into an electric signal;

said zoom lens including a first lens group having a positive refracting power, a second lens group having a negative refracting power and serving as a movable group upon power variation of said zoom lens, and a plurality of movable lens groups cooperable with said second group to form a macro lens group, said first lens group, second lens group and movable lens groups being disposed in order from an object side, said movable lens groups including a single focusing group and an additional lens group disposed on the image side with respect to said single focusing group and having a negative refracting power;

said zoom lens having a macro mode in which said zoom lens can be focused at a shorter distance than an ordinary region by moving said macro lens group integrally from a position at the telephoto end toward the object side while said first lens group is fixed at a telephotograph end;

wherein said ordinary region is a region where said single focusing group can focus on, upon power variations of said zoom lens; and wherein, where the focal length of the entire lens system at the wide angle end is represented by fw and the back focus at the wide angle end is represented by Twbf, the expression $0.2 < |Twbf/fw| < 1.2$ is satisfied.

7. The image pickup apparatus according to claim 6, wherein said plurality of movable lens group including a third lens group having a positive refracting power, a fourth lens group having a positive refracting power and performing focusing when moved in a direction of an optical axis, a fifth lens group having a low refracting power, and a sixth lens group having a negative refracting power, said second to sixth lens groups forming said macro lens group.

* * * * *